(12) United States Patent
Miki et al.

(10) Patent No.: US 7,325,832 B2
(45) Date of Patent: Feb. 5, 2008

(54) ROLL BAR STRUCTURE OF VEHICLE

(75) Inventors: Kenjiro Miki, Hiroshima (JP);
Takayuki Kimura, Hiroshima (JP);
Takashi Ebisugi, Hiroshima (JP);
Yukari Fujii, Hiroshima (JP);
Masataka Masuda, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 381 days.

(21) Appl. No.: 10/990,407

(22) Filed: Nov. 18, 2004

(65) Prior Publication Data

US 2005/0140129 A1 Jun. 30, 2005

(30) Foreign Application Priority Data

Dec. 24, 2003 (JP) .............................. 2003-427831
Dec. 24, 2003 (JP) .............................. 2003-427833

(51) Int. Cl.
*B60R 21/13* (2006.01)
(52) U.S. Cl. ...................................................... 280/756
(58) Field of Classification Search ................. 280/756
See application file for complete search history.

(56) References Cited

U.S. PATENT DOCUMENTS

| | | | | |
|---|---|---|---|---|
| 5,056,816 A | * | 10/1991 | Lutze et al. ................. | 280/751 |
| 5,094,478 A | * | 3/1992 | Pfanzeder et al. ........... | 280/756 |
| 5,224,735 A | * | 7/1993 | Jambor et al. ............... | 280/756 |
| 5,236,219 A | * | 8/1993 | Jambor et al. ............... | 280/756 |
| 5,487,564 A | * | 1/1996 | Fueller et al. ............... | 280/808 |
| 5,622,382 A | * | 4/1997 | Zepnik et al. ............... | 280/756 |
| 5,626,361 A | * | 5/1997 | Heiner ........................ | 280/756 |
| 5,641,193 A | * | 6/1997 | Zepnik et al. ......... | 296/107.09 |
| 5,890,738 A | * | 4/1999 | Heiner et al. ............... | 280/756 |
| 6,247,743 B1 | * | 6/2001 | Bonanno ................ | 296/136.01 |
| 6,378,930 B1 | * | 4/2002 | Brettmann .................... | 296/85 |
| 6,572,145 B1 | * | 6/2003 | Guillez et al. .............. | 280/756 |
| 6,805,378 B2 | * | 10/2004 | Berges et al. ............... | 280/756 |
| 6,902,190 B2 | * | 6/2005 | Nass .......................... | 280/756 |
| 6,988,744 B2 | * | 1/2006 | Muller ....................... | 280/756 |

(Continued)

FOREIGN PATENT DOCUMENTS

DE 29700092 U1 * 2/1997

(Continued)

OTHER PUBLICATIONS

European Search Report Application No. EP 04 03 0047 dated Mar. 31, 2005.

*Primary Examiner*—Faye M. Fleming
(74) *Attorney, Agent, or Firm*—Nixon Peabody LLP; Donald R. Studebaker

(57) ABSTRACT

A roll bar structure of a vehicle equipped with side panels and an open top, including a crossbar having a closed section and extending in a vehicle width direction between both of the side panels, the roll bars having a reverse-U shape and at least pan thereof projecting above the crossbar, and through holes formed at upper and lower portions of the crossbar, wherein one-side part of the roll bar extending substantially vertically penetrates the through holes, and the roll bars are connected respectively with the upper and lower portions of the crossbar which the roll bars penetrate, such that, a resistance of the roll bar structure against a vehicle rollover can be increased by firmly connecting the roll bars with the crossbar.

17 Claims, 13 Drawing Sheets

U.S. PATENT DOCUMENTS

| | | | |
|---|---|---|---|
| 7,032,927 B1 * | 4/2006 | Joranlien | 280/756 |
| 7,175,199 B2 * | 2/2007 | Muller | 280/756 |

FOREIGN PATENT DOCUMENTS

| | | | |
|---|---|---|---|
| DE | 29914157 U1 * | 12/1999 | |
| DE | 19910007 | 3/2000 | |
| DE | 20007688 | 10/2000 | |
| DE | 10218701 | 6/2003 | |
| EP | 1028050 A2 * | 8/2000 | |
| JP | 04310448 A * | 11/1992 | |
| JP | 11115662 | 4/1999 | |
| JP | 11321334 | 11/1999 | |

* cited by examiner

ROLL BAR STRUCTURE OF VEHICLE

BACKGROUND OF THE INVENTION

The present invention relates to a roll bar structure of a vehicle, and more specifically to a roll bar structure of a vehicle equipped with an open top and a side panel forming a vehicle side face.

In recent years, a so-called open car equipped with an open top has had a roll bar which is provided over a vehicle body to protect a driver's head during a vehicle rollover. It is known that such a roll bar is connected with a reinforcement member extending in a vehicle width direction in order to increase its resistance against the vehicle rollover. For example, Japanese Patent Laid-Open Publication No. 11-115662 discloses a roll bar structure of a vehicle, in which both ends of a base portion extending in the vehicle width direction are fixed respectively to side bodies of an automotive vehicle, and both ends of a pair of reverse-U-shaped members extending upward are fixed to this base portion by welding. Also, Japanese Patent Laid-Open Publication No. 11-321334 discloses that the roll bar is attached to side panels of the vehicle via open-top supporting brackets in order to increase an attaching strength of the roll bar.

In the conventional roll bar structure of a vehicle, however, since the member extending in the vehicle width direction and the roll bar extending upward are abutted and welded there, there is concern that a large load applied to the roll bar during the vehicle rollover and the like may cause the welded connection to be released and thus a resistance of the roll bar against the vehicle rollover may not increase sufficiently. Also, the roll bar is generally formed in a bent shape in order that an enough cabin space or storing space of the open top is provided, and its interference with any other equipments is avoided. Herein, it is generally difficult to connect firmly such a bent-shaped roll bar with a crossbar extending in the vehicle width direction.

SUMMARY OF THE INVENTION

The present invention has been devised in view of the above-described problems, and an object of the present invention is to provide a roll bar structure of a vehicle which can increase properly its resistance against the vehicle rollover by connecting firmly the roll bar with the crossbar.

According to the present invention, there is provided a roll bar structure of a vehicle equipped with an open top and a side panel forming a vehicle side face, comprising a crossbar having a closed section and extending in a vehicle width direction between both of the side panels, a roll bar having a substantially reverse-U shape and at least part thereof projecting above the crossbar, and through holes being formed at upper and lower portions of the crossbar, wherein an one-side part of the roll bar extending substantially vertically penetrates the through holes, and the roll bar is connected respectively with the upper and lower portions of the crossbar which the roll bar penetrates.

In the present invention, the one-side part of the roll bar extending substantially vertically penetrates the through holes at the upper and lower crossbar portions and the roll bar is connected respectively with the upper and lower crossbar portions which the roll bar penetrates. Accordingly, even if a force is generated at the connecting portion of the roll bar and crossbar which is operative to separate the roll bar from the crossbar by a bending moment applied to the roll bar during the vehicle rollover, this force can be properly born by both of the upper and lower portions of the crossbar. As a result, the resistance of the roll bar structure of a vehicle against the vehicle rollover can be improved. Also, since there is not necessarily need to provide any additional members to fix the roll bar to the crossbar, the number of parts can be reduced properly.

Also, according to a preferred embodiment, the crossbar includes a first crossbar member and a second crossbar member which are disposed in front and in rear, and the through holes are formed at either the first crossbar member or second crossbar member.

Accordingly, since the through holes are formed at either the first crossbar member or second crossbar member, the bending moment against the roll bar is born by a single member. As a result, the resistance of the roll bar structure of a vehicle against the vehicle rollover can be improved effectively.

Also, according to another preferred embodiment, there are provided recess portions to constitute opening portions at respective upper and lower portions of the first and second crossbar members, and an other-side part of the roll bar extending substantially vertically penetrates the opening portions.

In this preferred embodiment, there are provided recess portions to constitute opening portions at respective upper and lower portions of the first and second crossbar members, and the other-side part of the roll bar extending substantially vertically penetrates the opening portions. Accordingly, the bending moment against the roll bar can be born by both the upper portions and the lower portions of the crossbar comprised of the first and second crossbar members. Also, at respective upper and lower portions of the first and second crossbar members are provided the respective recess portions constituting opening portions for the other-side part of the roll bar penetrating. Accordingly, the roll bar having its lower bent portion can be provided properly so as to penetrate the crossbar vertically, and the roll bar can be connected with the crossbar firmly. Also, after the other-side part of roll bar is disposed at the recess portions of the one of crossbar members, the other one of crossbar members can be assembled. Accordingly, the roll bar having its lower bent portion can be provided properly so as to penetrate the crossbar vertically.

Also, according to another preferred embodiment, there is provided a spacer member at a portion of the roll bar which penetrates the opening portion at the crossbar and is located within the closed section of the crossbar, the spacer member extends longitudinally, and both ends thereof contact a front portion and a rear portion of the crossbar respectively.

Accordingly, since there is provided the spacer member at the roll bar which extends longitudinally and both ends of which contact the front and rear portions of the crossbar respectively, a longitudinal positioning of the roll bar and crossbar can be attained surely. Also, since the bending moment against the roll bar is born by the spacer member in addition to the upper and lower portions of the crossbar, the resistance of the roll bar structure against a force which the roll bar receives from a road surface can be improved.

Also, according to another preferred embodiment, the spacer member is formed of a cylindrical member, and there is further provided a fastening member which penetrates the front and rear portions of the crossbar and the spacer member, and fixes the spacer member to the crossbar.

Accordingly, since the fastening member fixes the spacer member to the crossbar, penetrating the front and rear portions of the crossbar and the spacer member, the roll bar and the crossbar can be connected firmly. Further, even in case the fastening member has been loosened or welding at the connection portions of the upper and lower portions of the crossbar and the roll bars have been weakened, both ends of the spacer member contact respectively the front and rear portions of the crossbar, and therefore the crossbar can bear the force from the road surface properly along with the crossbar. As a result, the resistance of the roll bar structure against the vehicle rollover can be ensured effectively.

Also, according to another preferred embodiment, either one of the first and second crossbar members includes an upper wall potion, a vertical wall portion and a lower wall portion, the upper and lower wall portions extend forward or rearward from the vertical wall portion, the other one of the first and second crossbar members includes flange portions which extend in the same direction as the upper and lower wall portions of either one of crossbar members, and the upper and lower wall portions of either one of crossbar members and the flange portions of the other one of crossbar members are connected with each other.

Accordingly, since the upper and lower wall portions of either one of crossbar members and the flange portions of the other one of crossbar members which extend in the same direction as these upper and lower wall portions are connected with each other, the connecting face is located on the same face as the upper and lower faces of the crossbar. Thus, connecting of the crossbar members against a shearing force which is applied to the crossbar caused by the longitudinal bending moment to the roll bar can be remained sufficiently firm. As a result, the strength of the crossbar against the longitudinal bending moment applied to the roll bars can be increased. Also, welding works applied to the flange portions can be done easily by a welding tool being inserted from the front or the rear, and thus the productivity can be improved as well.

Also, according to another preferred embodiment, the other one of crossbar members includes an upper wall potion, a vertical wall portion and a lower wall portion, the flange portions are formed respectively at the upper and lower wall portions of the other one of crossbar member, the recess portions at the other one of crossbar members are configured so as to open in an opposite direction to the flange portions extending, and there are further provided upper and lower notch portions respectively at an upper end portion and a lower end portion of the vertical wall portion of the other one of crossbar members between the flange portions and the recess portions.

In this preferred embodiment, there are provided the upper and lower notch portions respectively at the upper and lower end portions of the vertical wall portion and these notch portions are located between the flange portions and the recess portions. Accordingly, since there exists a space between the recess portions and the flange portions of the crossbar members, bending works of these portions in opposite directions to each other can be done smoothly without any interferences of bending tools. Also, the vertical wall portion between the recess portions and the flange portions of the crossbar members can be properly prevented from deforming improperly under the influence of the bending works of these portions.

Also, according to another preferred embodiment, the roll bar structure further comprises a link bracket attached to the side panel to rotatably support the open top, and a connecting member connecting the roll bar with the link bracket, wherein the crossbar is connected with the connecting member along with the roll bar.

Accordingly, since the connecting member connects the roll bar with the link bracket and the crossbar is connected with the connecting member along with the roll bar, the force from the road surface which the roll bar receives during the vehicle rollover is conveyed separately to the side panel and the crossbar. Also, an impact load which the side panel receives from the vehicle side during a vehicle side-impact or the like is conveyed separately to the roll bar and the crossbar. As a result, the resistance of the roll bar structure against the force from the roll bars and the side impact load can be improved. Further, both the roll bar and crossbar bear properly a force which will let the link bracket fall down inwardly, which is caused by the weight of a folding top supported by the link bracket or a retractable hard top. Accordingly, the link bracket can be prevented properly from falling down inwardly.

Also, according to another preferred embodiment, the roll bar and the connecting member are connected via a fastening member which penetrates them.

Since the roll bar and the connecting member are connected via the fastening member penetrating them, an integral rigidity of these members are increased, thereby improving their load-conveyance function.

Also, according to another preferred embodiment, the crossbar is connected with the roll bar and the connecting member via a fastening member which penetrates them.

Accordingly, since the crossbar is connected with the roll bar and the connecting member via the fastening member penetrating them, an integral rigidity of these members are increased, thereby improving their load-conveyance function.

Also, according to another preferred embodiment, there are provided a plurality of the fastening members which are disposed separately in a substantially vertical direction of the vehicle.

Accordingly, since the plural fastening members are disposed separately in the vertical direction, the load-conveyance function of these members can be further improved surely. Particularly, the force letting the link bracket fall dawn inwardly due to the weight of the folding top or retractable hard top during the opening and closing of them can be conveyed separately to the roll bar and the crossbar surely.

Also, according to another preferred embodiment, the roll bar structure further comprises a vehicle-body reinforcement frame extending in the vehicle width direction to interconnect respective lower portions of the side panels, a first connecting member connecting the roll bar and the crossbar with the side panel, and a second connecting member connecting the roll bar with the side panel, the second connecting member being located below the first connecting member and above the vehicle-body reinforcement frame.

Accordingly, since the first connecting member connects the roll bar and crossbar with the side panel and the second connecting member connects the roll bar with the side panel, the side impact load acting on the side panel can be conveyed separately to the roll bar and crossbar via these two connecting members. Also, since the second connecting member connects the roll bar with the side panel below the first connecting member and above the vehicle-body reinforcement frame, the side impact load acting on the side panel above the vehicle-body reinforcement frame can be born by the roll bar via the second connecting member, and then the load convened to the roll bar can be born by the crossbar as well. As a result, passenger's head, shoulders and the other can be protected properly during the vehicle side impact and the like.

Also, according to another preferred embodiment, the vehicle further includes a storing potion to store the open top which is disposed behind the roll bar, and a fuel tank which is disposed behind the vehicle-body reinforcement frame and below the storing portion.

Accordingly, even if the vehicle-body reinforcement member has a relatively small area of its closed section to provide the enough disposition space for the folding-top storing portion and the fuel tank, since the side impact load is conveyed separately to the roll bar and crossbar via the first and second connecting members, the passenger can be further protected properly.

Also, according to another preferred embodiment, at the side panel is provided a bolt to allow the open top temporarily to be placed thereon during an assembly of the open top, and the second connecting member is connected with the side panel via said bolt.

Accordingly, since the second connecting member is connected with the side panel via the bolt, there is not necessarily need to provide any additional members to fix the second connecting member to the side panel, the number of parts can be reduced properly.

Also, according to another preferred embodiment, the roll bar is connected with the vehicle-body reinforcement frame at a lower end thereof.

Accordingly, the side impact force applied to the vehicle-body reinforcement frame is conveyed to the roll bar, and then the force conveyed to the roll bar is conveyed to the vehicle-body reinforcement frame.

Also, according to another preferred embodiment, the roll bar structure further comprises a hole formed at a front side or a rear side of the roll bar, a connecting member attached to a portion of the roll bar which is near said hole, a connecting member extending in the vehicle width direction to interconnect the side panel and the connecting member on the roll bar, an outer end of the connecting member being fixed to the side panel, a fastened member fixed to the connecting member on the roll bar, at least part of the fastened member being located in the hole of the roll bar, a hole formed at an inner end of the connecting member extending in the vehicle width direction, the fastened member and a fastening member, which is engaged with the fastened member, penetrating the hole, the hole having such a specified diameter that there exists a clearance around the fastening member, wherein the inner end of the connecting member extending in the vehicle width direction is connected with the connecting member on the roll bar via the fastened and fastening members.

In this preferred embodiment, there is provided the hole formed at the inner end of the connecting member extending in the vehicle width direction to interconnect the side panel and the connecting member on the roll bar, through which the fastened member and the fastening member penetrate and which has the above-described specified diameter. Accordingly, even if there exists an error in a relative distance between the side panel and the roll bar in the vehicle width direction due to attaching errors during an assembly of the roll bar to the vehicle body, such an error in the relative distance can be properly absorbed by an existence of the above-described clearance. Thus, the connecting members extending in the vehicle width direction to interconnect the side panel and the roll bar can be properly provided. Also, part of the fastened member fixed to the connecting member on the roll bar is located in the hole of the roll bar. Accordingly, when the side impact load is applied to the connecting member extending in the vehicle width direction, the fastened member hits an edge of the hole of the roll bar and the side impact load can be properly conveyed to the roll bar via the connecting member extending in the vehicle width direction thereby.

Also, according to another preferred embodiment, the connecting member on the roll bar is attached to the roll bar in a position over the hole of the roll bar, the connecting member on the roll bar includes a flange portion which extends respectively in a substantially perpendicular direction to an axial line of the roll bar from both ends thereof toward the roll bar, and the flange portion is fixed to said roll bar.

Accordingly, since the connecting member on the roll bar is fixed to the roll bar over the hole, a decrease of an axial-direction rigidity of the roll bar due to forming of the hole can be restrained properly. Herein, the flange portion of the connecting member on the roll bar extends substantially perpendicularly to the axial line of the roll bar, and only the flange portion is fixed to the roll bar. Accordingly, the connecting member on the roll bar is fixed to the roll bar having a relatively low rigidity against the side impact load conveyed from the connecting member extending in the vehicle width direction. However, even if a relatively large side impact load is applied and then the fixing of the connecting member to the roll bar is released, the fastened member fixed to the connecting member on the roll bar hit the edge of hole of the roll bar surely. As a result, the side impact load from the connecting member extending in the vehicle width direction can be conveyed to the roll bar properly.

Also, according to another preferred embodiment, the connecting member extending in the vehicle width direction has a closed section.

Accordingly, the rigidity of the connecting member extending in the vehicle width direction can improve, and the side impact load can be conveyed to the roll bar surely.

Other features, aspects and advantages of the present invention will become apparent from the following description which refers to the accompanying drawings.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Figure 1:
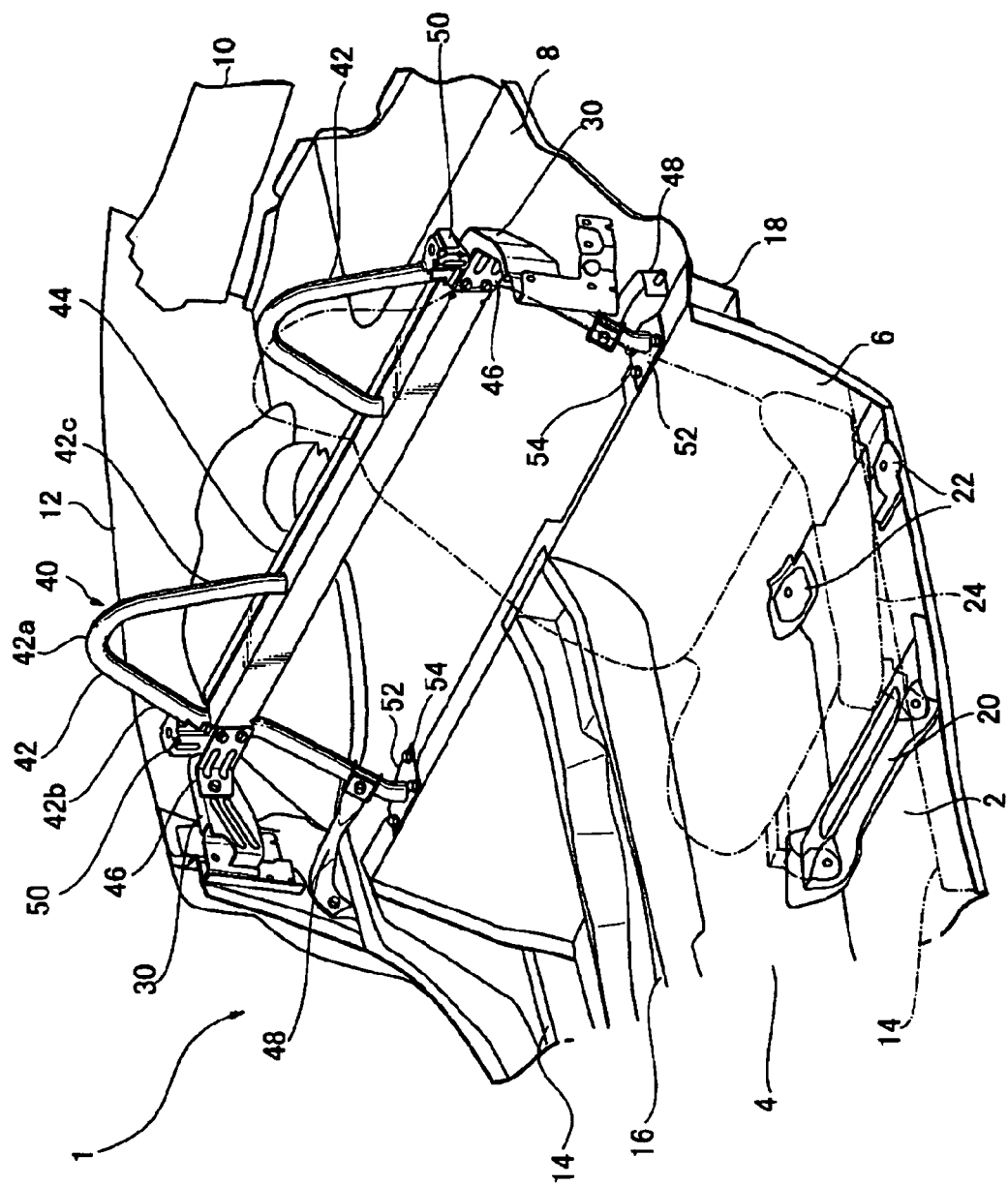
FIG. 1 is a perspective view illustrating a rear portion of a vehicle equipped with a roll bar structure of the vehicle according to an embodiment of the present invention.
Figure 2:
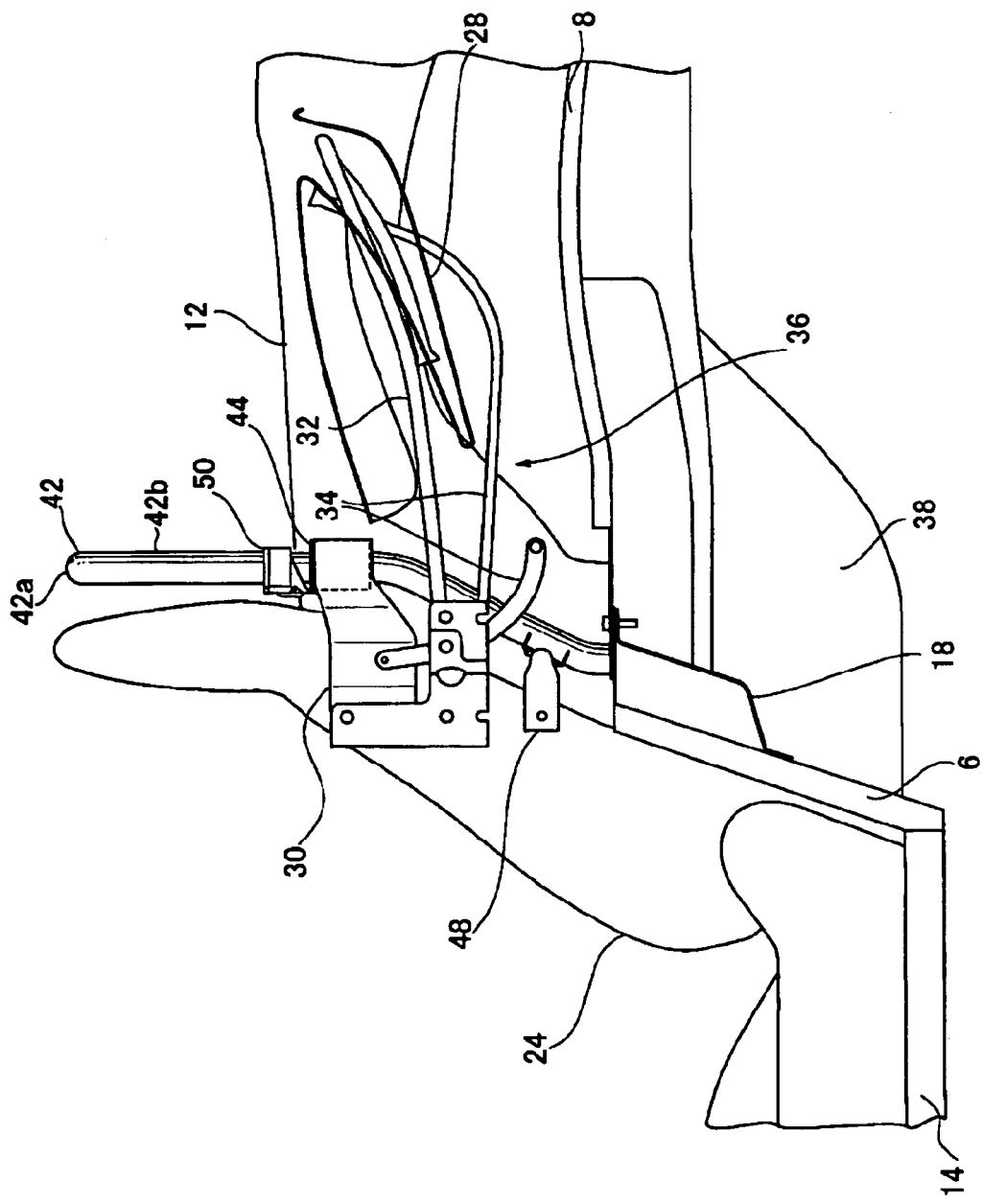
FIG. 2 is a side view, when viewed from left, of the rear potion of the vehicle equipped with the roll bar structure of the vehicle according to the embodiment of the present invention.

FIG. 1 is a perspective view illustrating a rear portion of a vehicle equipped with a roll bar structure of the vehicle according to an embodiment of the present invention. FIG. 2 is a side view, when viewed from left, of the rear potion of the vehicle equipped with the roll bar structure of the vehicle according to the embodiment of the present invention.

A vehicle 1 comprises, as illustrated in FIG. 1, a floor panel 2 which constitutes a cabin floor, a floor tunnel 4 which projects upward from the floor panel 2 and extends longitudinally, a kickup panel 6 which extends slat, i.e., upward and rearward, at a rear end portion of the floor panel 2 and the floor tunnel 4, a rear floor panel 8 which extends rearward from an upper end portion of the kickup panel 6 to constitute a luggage floor, a rear panel 10 which extends vertically at a rear end portion of the rear floor panel 8, and a pair of side panels 12 which extend vertically to constitute both-side faces of the vehicle.

The vehicle 1 further comprises a pair of side sills 14 which extend longitudinally at right-and-left both ends of the floor panel 2, a backbone frame 16 which extends longitudinally on the floor tunnel 4, and a cross member 18 having a rectangular structure with a closed section which is connected to a rear end potion of the backbone frame 16 and extends in a vehicle width direction between the both-side side panels 12, which are respectively as vehicle-body reinforcement frames.

On the floor panel 2 are provided a front seat bracket 20 and a rear seat bracket 22, which extend respectively in the vehicle width direction at the both sides of the floor tunnel 4. A seat 24 (only left-side seat is illustrated) is attached to these brackets 20 and 22. A pair of link brackets 30 are fixed to the pair of side panels 12 to rotatably support a folding top 28 or a retractable hardtop (not illustrated) as a open top respectively.

As illustrated in FIG. 2, a main link 32 and a sub link 34 to open and close the folding top 28 are supported rotatably at the link brackets 30. The folding top 28 and the respective links 32 and 34 are illustrated in FIG. 2 to be stored in a folding-top storing portion 36. A fuel tank 38 is disposed below the folding-top storing portion 36 and behind the kickup panel 6 and the cross member 18. Herein, the cross member 18 has the rectangular structure with the closed section which has a relatively narrow width and a relatively small area, in order to provide an enough disposition space for the folding-top storing portion 36 and the fuel tank 38.

The vehicle 1 further comprises a roll bar device 40 behind the seat 24 as illustrated FIGS. 1 and 2. The roll bar device 40 comprises a pair of roll bars 42 which extend vertically, a crossbar 44 which extends in the vehicle width direction between the pair of side panels 12, upper connecting members 46 which connect the roll bars 42 and crossbar 44 with the link bracket 30, lower connecting members 48 which connect the roll bar 42 with the side panels 12, and belt anchor attaching members 50 which are fixed to the roll bars 42 and the crossbar 44 so as to be laid across them.

Figure 3:
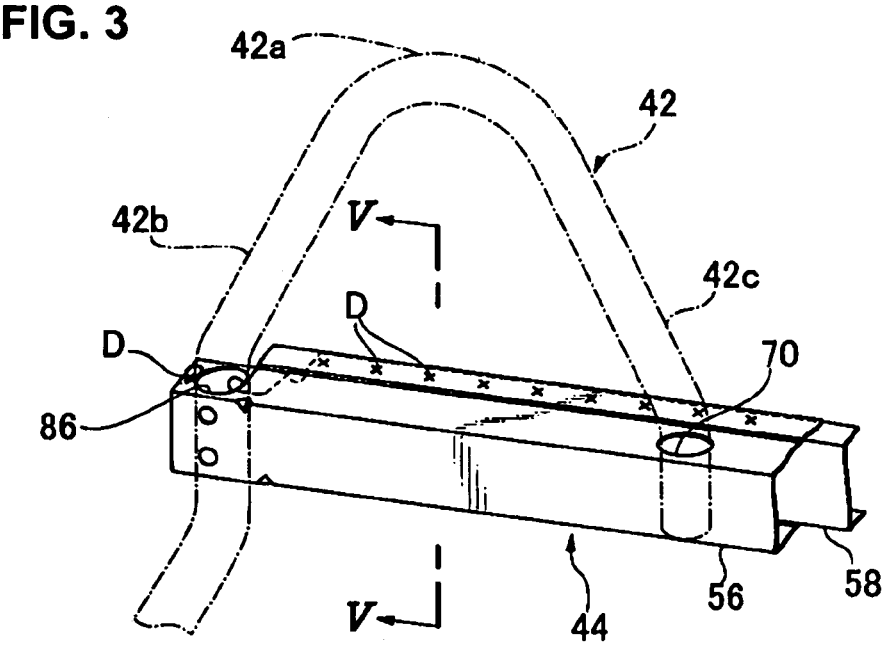
FIG. 3 is a major-part enlarged perspective view illustrating the roll bar and crossbar of the roll bar structure according to the embodiment of the present invention.
Figure 4:
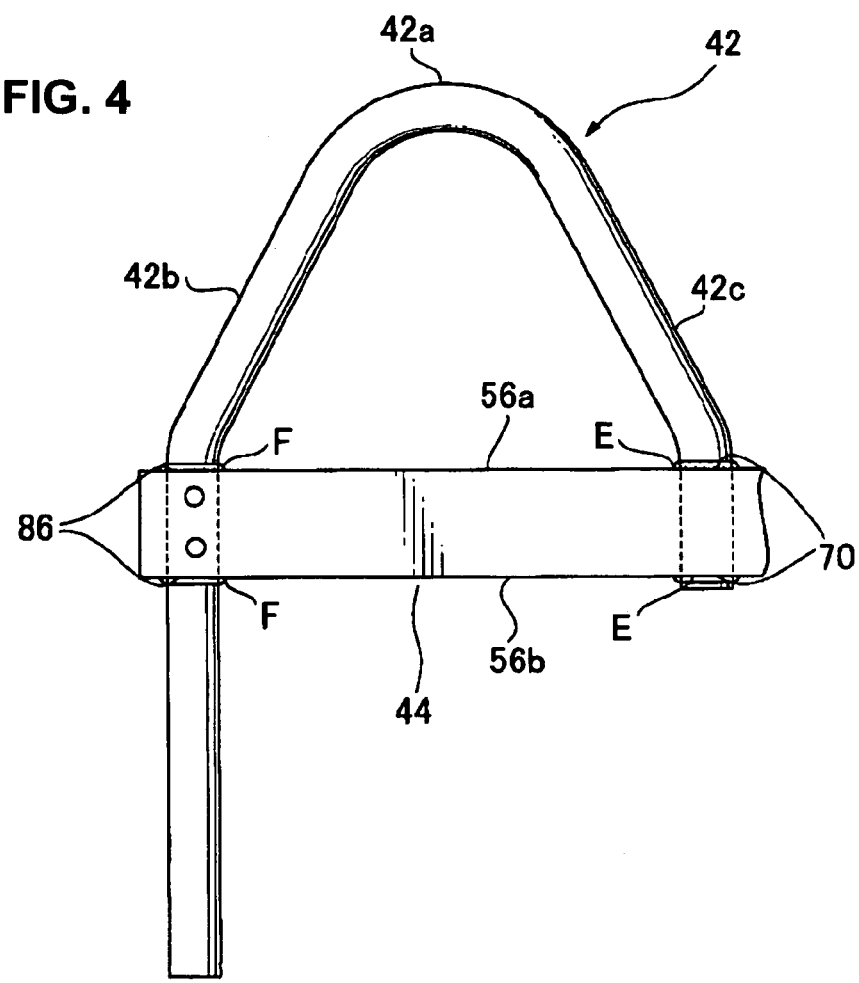
FIG. 4 is a major-part enlarged elevation view illustrating the roll bar and crossbar of the roll bar structure according to the embodiment of the present invention.

Next, a specific structure of the roll bar device 40 will be described referring to FIGS. 1 through 4. FIG. 3 is a major-part enlarged perspective view illustrating the roll bar and crossbar of the roll bar structure according to the embodiment of the present invention. FIG. 4 is a major-part enlarged elevation view illustrating the roll bar and crossbar of the roll bar structure according to the embodiment of the present invention.

First, the roll bar 42, as illustrated in FIGS. 1 and 2, is formed of a single pipe to be of a U shape, and it is provided at the crossbar 44 in such a manner that it extends vertically in a reverse-U shape and its part projects above the crossbar 4. The roll bar 42 comprises an upper part 42a which is greatly curved in the reverse-U shape, and an outside part 42b and an inside part 42c which respectively extend vertically at both sides of the upper part 42a.

As illustrated in FIGS. 1 through 4, each outside part 42b of the roll bar 42 penetrates the crossbar 44 and extends slant, i.e., downward and forward, below the crossbar 44, and its lower end is fixed to the cross member 18 via a substantially triangular flange 52 by three bolts 54. The inside part 42c also, as illustrated in FIGS. 3 and 4, penetrates the cross member 44 so that its lower end does not project so much below a lower wall portion of the cross member 44. This disposition of the cross member 44 having the outside part 42b extending downward and forward below the crossbar 44 and the inside part 42c not projecting so much below the cross member 44 ensures an enough space for the luggage and the folding-top storing portion 36.

Figure 5:
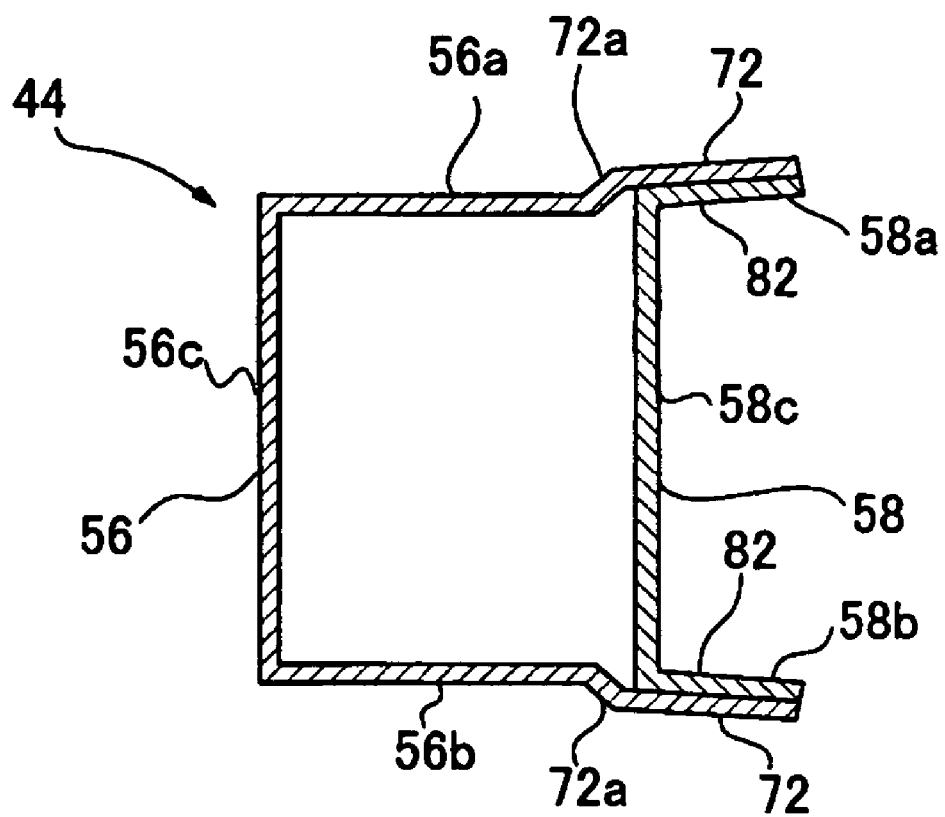
FIG. 5 is a sectional view taken along line V-V of FIG. 3.
Figure 6:
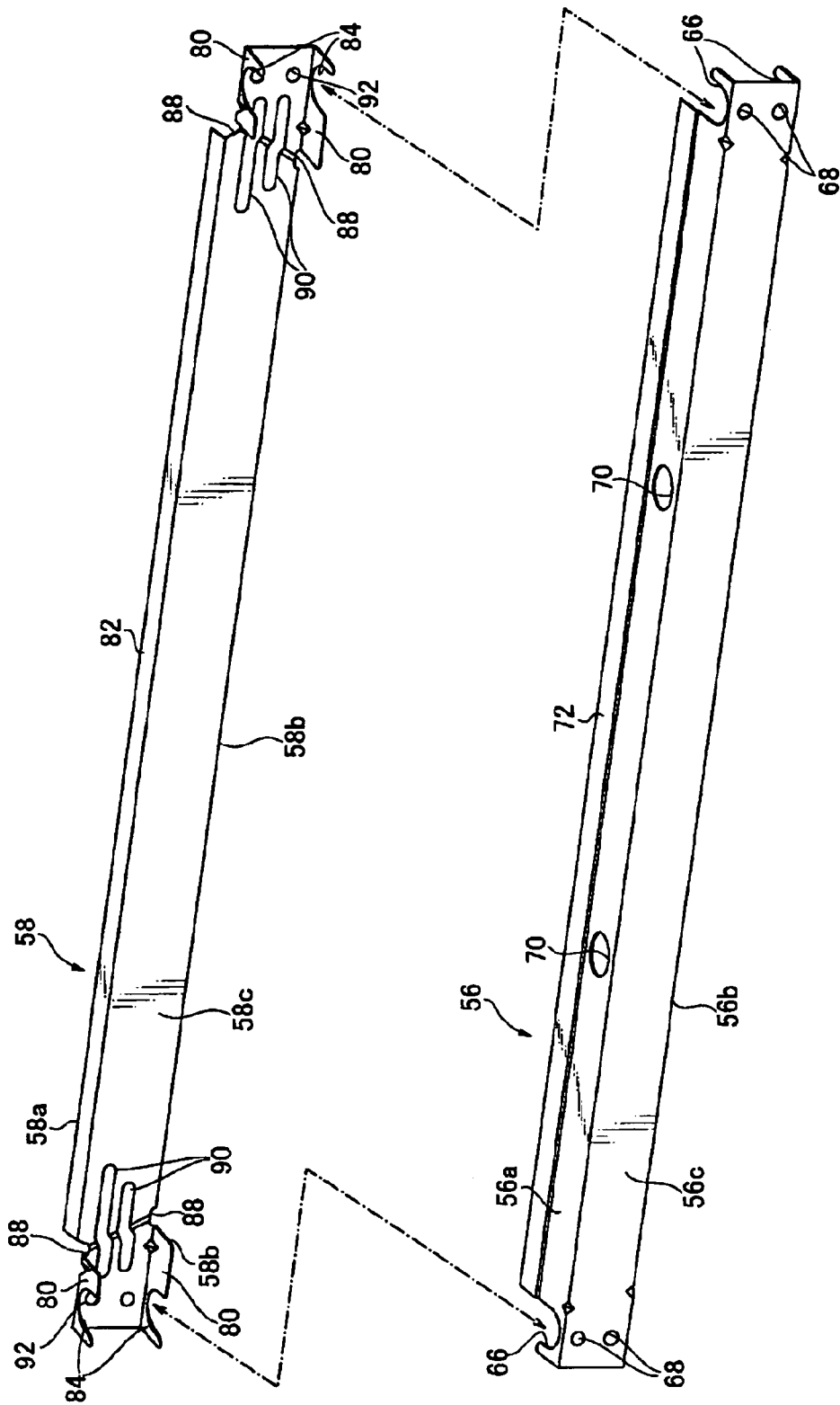
FIG. 6 is an exploded perspective view illustrating two members constituting the crossbar of the roll bar structure according to the embodiment of the present invention.

Next, a specific structure of the crossbar of the roll bar structure will be described referring to FIGS. 3, 5 and 6. FIG. 5 is a sectional view taken along line V-V of FIG. 3, and FIG. 6 is an exploded perspective view, when viewed in the same direction as FIG. 1, illustrating two members constituting the crossbar of the roll bar structure according to the embodiment of the present invention. As illustrated in FIGS. 3, 5 and 6, the crossbar 44 comprises a front crossbar member 56 which is located forward and a rear crossbar member 58 which is located rearward, which form the rectangular closed-section structure.

The front crossbar member 56 comprises an upper wall portion 56a, a lower wall portion 56b and a vertical wall portion 56c connecting the upper and lower wall portions. At both ends of the front crossbar member 56, a pair of recess portions 66 which open rearward are formed on the upper and lower wall portions 56a and 56b. At the vertical wall portion 56c are formed two bolt holes 68 in the same position as the recess portion 66 in the vehicle width direction.

Also, there are provided a pair of through holes 70 on the upper and lower wall portions 56a and 56b of the front crossbar member 56, which is located inside the recess portions 66. The above-described inside parts 42c of the roll bars 42 penetrate these trough holes 70 vertically. Further, the upper and lower wall portions 56a and 56b of the front crossbar member 56 include flange portions 72 at their rear ends. These flange portions 72 have difference in level with respect to faces of the portions with the through holes 70 and recess portions 66 in such a manner that the upper wall portion 56a steps up, while the lower wall portion 56b steps down.

Next, as illustrated in FIGS. 3, 5 and 6, the rear crossbar member 58 comprises an upper wall portion 58a, a lower wall portion 58b and a vertical wall portion 58c connecting the upper and lower wall portions. The upper and lower wall portions 58a and 58b of the rear crossbar member 58 include respectively roll bar support portions 80 which extend forward at their both ends, and flange portions 82 which extend rearward between the roll bar support portions 80. The roll bar support portions 80 and the flange portions 82 are disposed so as to be away from each other in the vehicle width direction via notch portions 88 which will be described later.

At the roll bar support portions 80 of the rear crossbar member 58 are provided a pair of recess portions 84 which open toward the front crossbar member 56. The recess portions 84 constitute opening portions 86 together with the pair of the recess portions 66 of the front crossbar member 56, and the above-described outside parts 42b extend vertically through the opening portions 86 as illustrated in FIG. 3. Also, as illustrated in FIGS. 3 and 5, the flange portions 82 of the rear crossbar member 58 are lapped over the flange portions 72 of the front crossbar member 56.

Also, as illustrated in FIG. 6, there are notch portions 88 which respectively open upwardly and downwardly in a R shape between the roll bar support portions 80 at the vertical wall portion 58c and the flange portions 82 of the rear crossbar member 58. These notch portions 88 are located in offset positions from each other in the vehicle width direction in such a manner that the roll bar support portions 80 at the upper wall portion 58a are shorter than those at the lower wall portion 58b in the vehicle with direction, while the flange portion 82 at the upper wall portion 58a is longer than that at the lower wall portion 58b in the vehicle with direction. Also, near the notch portions 88 at the vertical wall portion 58c, two beads 90 are provided so as to extend in the vehicle width direction sufficiently longer than the width of notch portions 88. Further, at both ends of the vertical wall portion 58c are provided two bolt holes 92 in the same positions in the vehicle width direction as the recess portions 84 formed at the upper and lower wall portions 58a and 58b.

Figure 7:
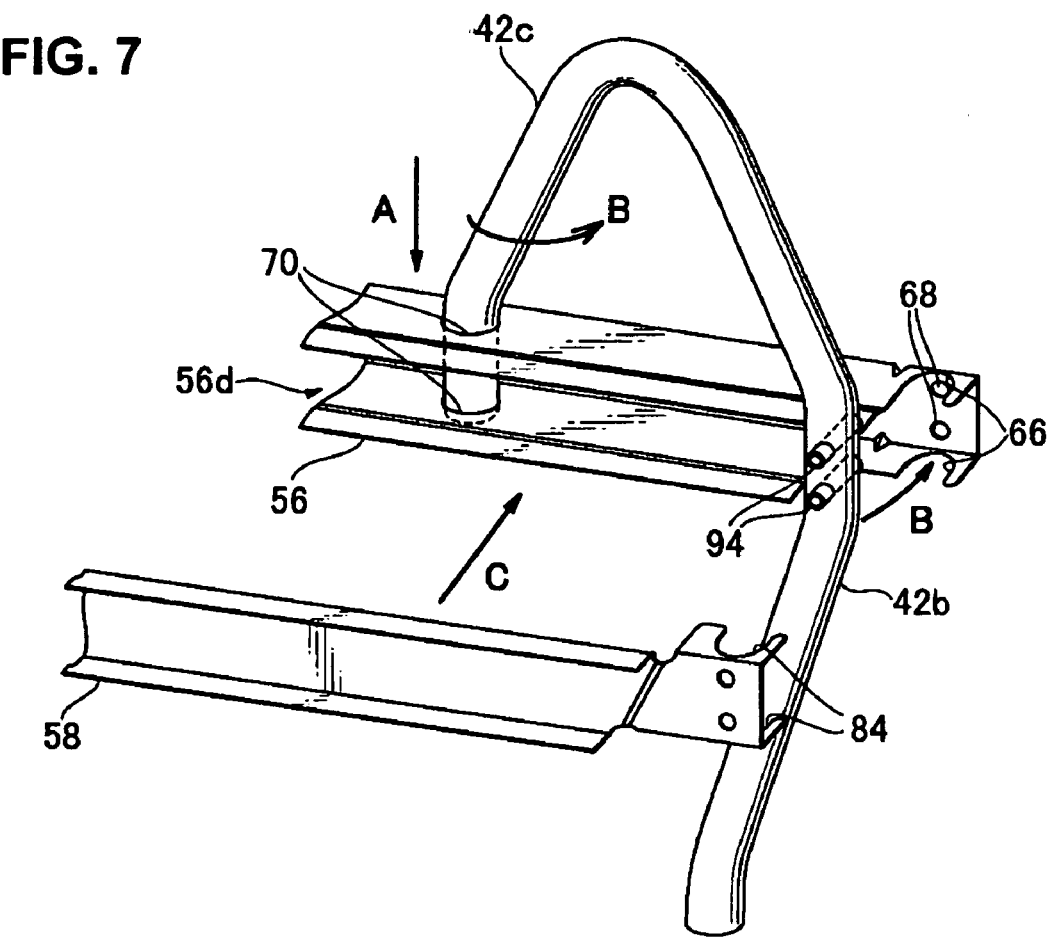
FIG. 7 is a perspective view illustrating schematically an attaching method of respective crossbar members and the roll bar of the roll bar structure according to the embodiment of the present invention.

Next, an attaching method of the front and rear crossbar members 56 and 58 and the roll bar 42 will be described referring to FIG. 7. FIG. 7 is a perspective view illustrating schematically an attaching method of respective crossbar members and the roll bar of the roll bar structure according to the embodiment of the present invention. First, as illustrated in FIG. 7, the inside part 42c of the roll bar 42 is inserted, as illustrated an arrow A, into the through holes 70 of the front crossbar member 56 from the above. Herein, the outside part 42b of the roll bar 42 is positioned so as to face the recess portions 66 of the front crossbar member 56.

Then, the roll bar 42 is rotated around the inside part 42c penetrating the through holes 70 as illustrated by an arrow B until the outside part 42b contacts the recess portions 66 of the front crossbar 56. Herein, a vertical position of the roll bar 42 may be adjusted so that tips of spacer members 94 provided at the outside part 42b, which will be described below, can correspond to the bolt holes 68 at the vertical wall portion 56c of the front crossbar member 56.

Subsequently, the rear crossbar member 58 is assembled facing the opening portion 56d of the front crossbar member 56 as illustrated by an arrow C. Accordingly, as illustrated in FIGS. 3 and 5, the respective flange portions 72 and 82 of these crossbar members 56 and 58 are lapped over each other and the outside part 42b is placed in the opening portions 86 formed by the recess portions 66 and 84 of these crossbar members 56 and 58. Herein, the longitudinal position of the rear crossbar member 58 may be adjusted properly via a difference-in-level 72a at the flange portions 72 of the front crossbar member 56 as illustrated in FIG. 5.

Next, the connecting structure of the front and rear crossbar members 56 and 58 will be described referring to FIGS. 3 and 5. The assembled front and rear crossbar members 56 and 58 are fixed firmly to each other, as illustrated in FIGS. 3 and 5, by spot-welding the respective flange portions 72 and 82, and the respective both end portions of upper and lower wall portions 56a and 56b of the front crossbar member 56 and the corresponding both end portions of upper and lower wall portions 58a and 58b of the front crossbar member 58 (the roll bar support portions 80) at plural points denoted by D in FIG. 3.

Figure 8:
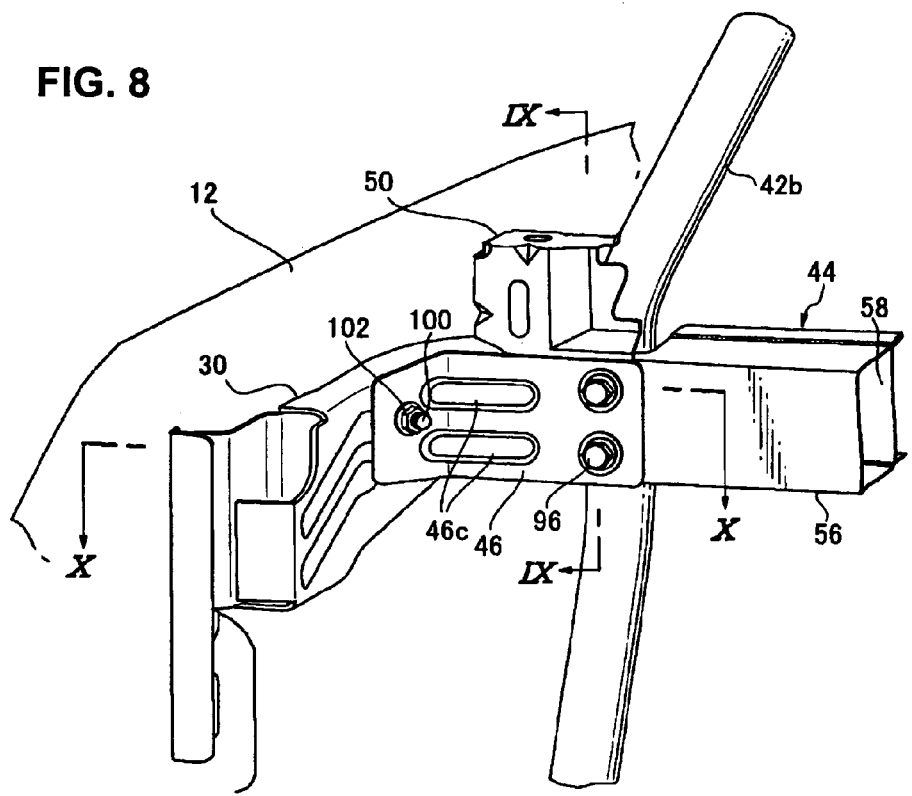
FIG. 8 is a major-part enlarged perspective view illustrating a connecting portion of the roll bar and crossbar with the side panel of the roll bar structure according to the embodiment of the present invention.
Figure 9:
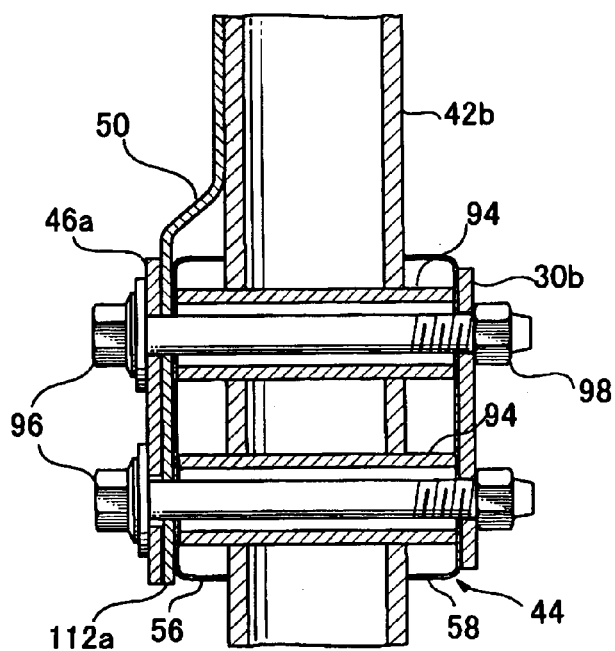
FIG. 9 is a sectional view taken along line IV-IV of FIG. 8.
Figure 10:
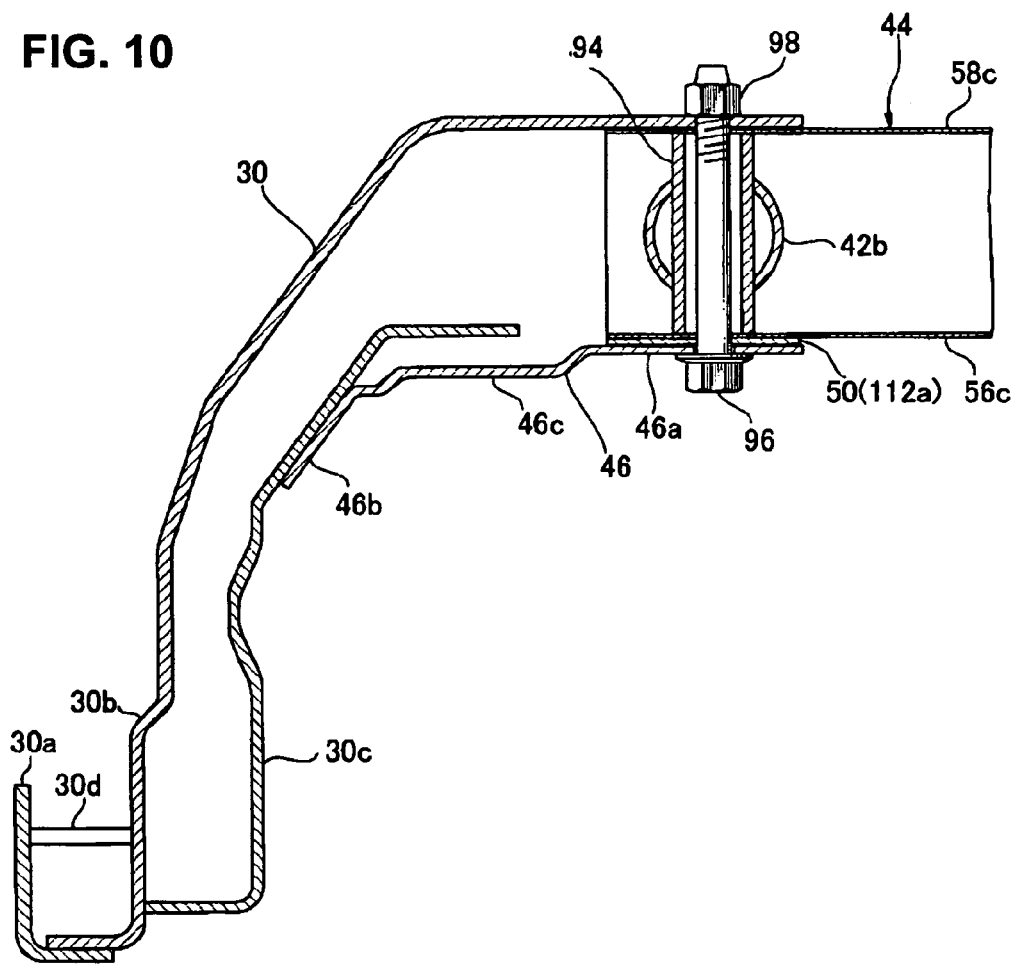
FIG. 10 is a sectional view taken along line V-V of FIG. 8.

Next, the connecting structure of the crossbar 44 and roll bar 42 will be described referring to FIGS. 4, 8 through 10. FIG. 8 is a major-part enlarged perspective view illustrating a connecting portion of the roll bar and crossbar with the side panel of the roll bar structure according to the embodiment of the present invention. FIG. 9 is a sectional view taken along line IV-IV of FIG. 8, and FIG. 10 is a sectional view taken along line V-V of FIG. 8. First, as illustrated in FIG. 4, the inside part 42c of the roll bar 42 and the upper and lower wall portions 56a and 56b of the front crossbar member 56 are welded together along their peripheral portions of the through holes 70 as illustrated by reference characters E. Also, the outside part 42b of the roll bar 42 and the upper wall portions 56a and 58a and the lower wall portions 56b and 58b of the front and rear crossbar members are respectively welded together along their peripheral portions of the opening portions 86 formed by the recess portions 66 and 84 of the crossbar members 56 and 58 as illustrated by reference characters F. Accordingly, the roll bar 42 and the crossbar 44 are fixed firmly to each other.

Further, as illustrated in FIGS. 8 through 10, the outside part 42b of the roll bar 42 and the crossbar 44 are connected via fastening members 96 and 98. As illustrated in FIGS. 9 and 10, two spacer members 94 which are disposed vertically and extend longitudinally are inserted tightly into respective holes formed at front and rear portions of the outside part 42b of the roll bar 42 and then they are welded together firmly (see FIG. 7). The spacer members 94 extend longitudinally within the closed section of the crossbar 44, and their both ends contact respectively the front wall portion of the crossbar 44 (the vertical wall portion 56c of the front crossbar member) and the rear wall portion of the crossbar 44 (the vertical wall portion 58c of the rear crossbar member).

Further, the spacer members 94 are fixed firmly to the crossbar 44 via the connecting members, i.e., bolts and nuts 96 and 98. More specifically, each of the bolt 96 is inserted, from the vehicle outside, through an one-end portion 46a of the upper connecting member 46 which will be described later, a fixing portion 112a of the belt anchor attaching member 50 which will be described later, the vertical wall portion 56c of the front crossbar member, the spacer member 94, the vertical wall portion 58c of the rear crossbar member, and one end of the link bracket 30, and eventually fixed by the nut 98.

Next, the connecting structure of the roll bar and crossbar and the link bracket will be described referring to FIGS. 8 through 10. The link bracket 30 comprises, as illustrated in FIGS. 8 and 10, mainly three members which are welded each other, i.e., a member 30a which is fixed to an inside face of the side panel 12 by welding, a member 30b which is located rearward and extends to the outside part 42b of the roll bar 42, and a member 30c which is located frontward. A pair of axis members (only an axis member 30d for the sub link is illustrated) to rotatably support the main link 23 and sub link 34 (see FIG. 2) are fixed to these members 30a, 30b and 30c. The link bracket 30 is connected with the roll bar 42 and crossbar 44 via the upper connecting member 46 at the vehicle front side, and via the member 30b being directly connected with the fastening members 96 and 98 at the vehicle rear side.

The upper connecting member 46 is formed of a plate which is slightly bent, and its one end portion 46a is connected with the roll bar 42 and crossbar 44, and its other end portion 46b is connected with the link bracket 30. The upper connecting member 46 has beads 46c which are formed thereon to extend laterally, and its rigidity is strengthened thereby. The one end portion 46a of the upper connecting member is connected with the roll bar 42 and crossbar 44 via the above-described fastening members 96 and 98. Meanwhile, the other end portion 46b is connected with the member 30c of the link bracket via the bolt 100 and nut 102 (see FIG. 8).

Figure 11:
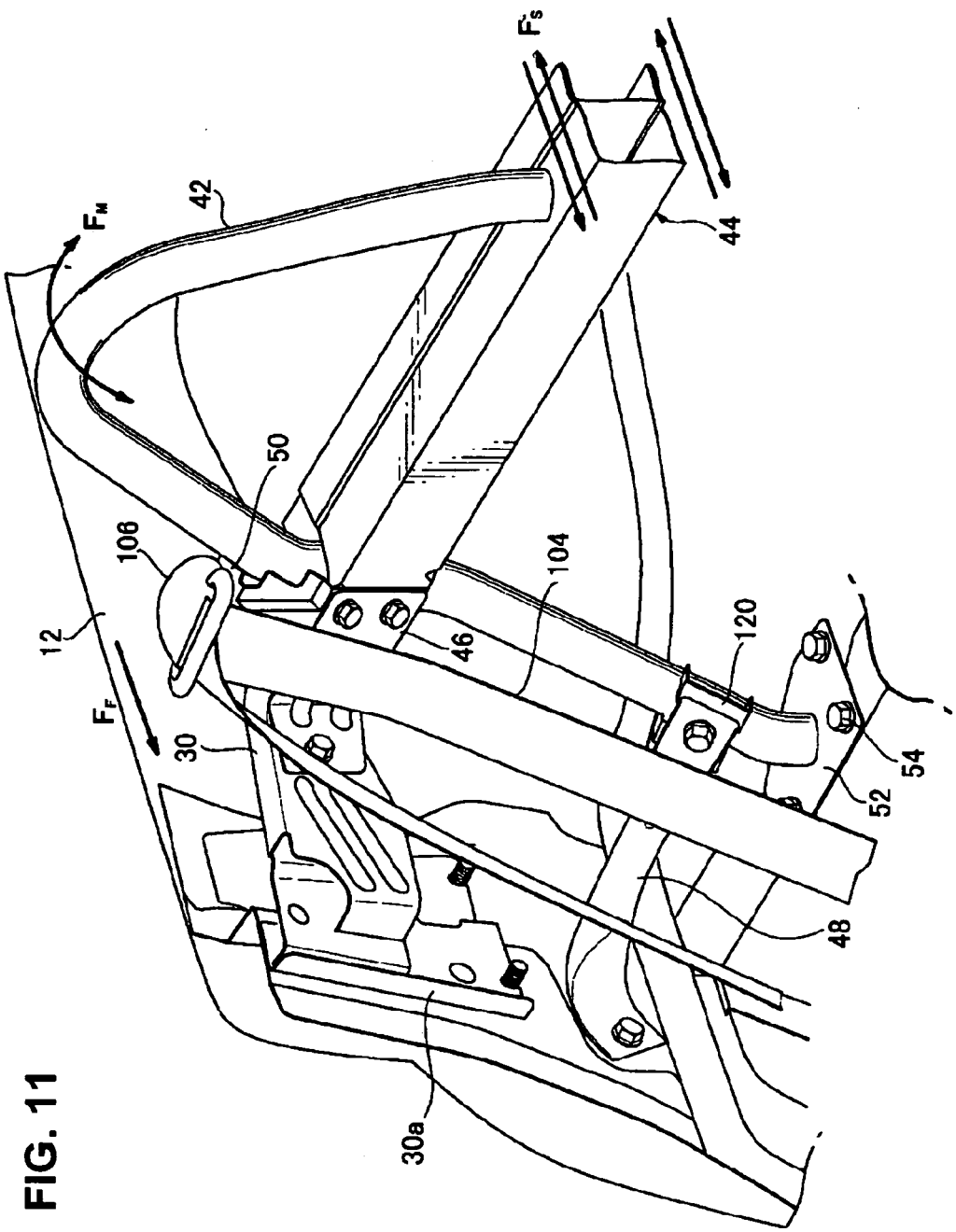
FIG. 11 is a major-part enlarged perspective view illustrating a belt anchor attaching member and a belt anchor of the roll bar structure according to the embodiment of the present invention.
Figure 12:
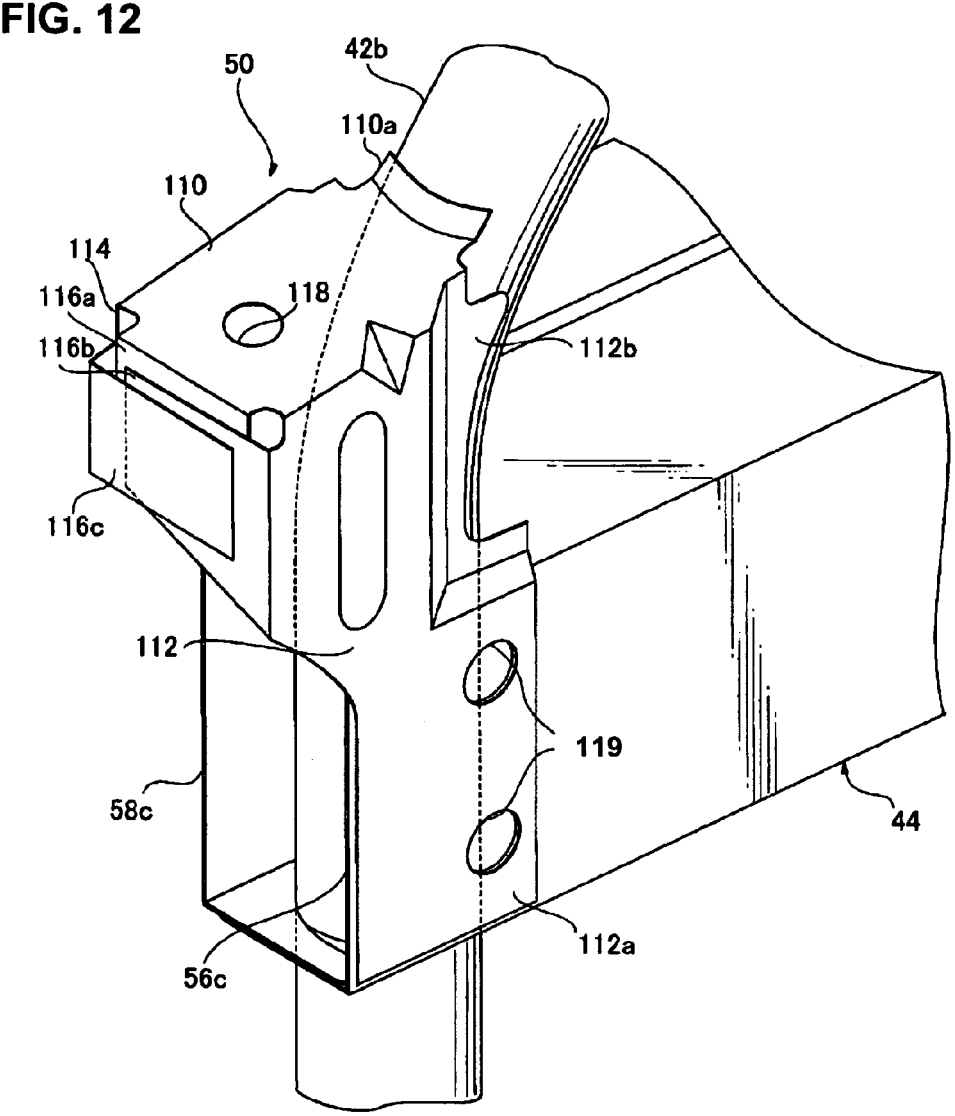
FIG. 12 is a major-part enlarged perspective view illustrating the belt anchor attaching member of the roll bar structure according to the embodiment of the present invention.

Next, the belt anchor attaching member 50 will be described referring to FIGS. 8 through 12. FIG. 11 is a major-part enlarged perspective view illustrating a belt anchor attaching member and a belt anchor of the roll bar structure according to the embodiment of the present invention. FIG. 12 is a major-part enlarged perspective view illustrating the belt anchor attaching member of the roll bar structure according to the embodiment of the present invention. First, the belt anchor attaching member 50 is fixed to the roll bar 42 and crossbar 44 as illustrated in FIG. 8, and then a belt anchor 106 to support a seat belt 104 is fixed to the belt anchor attaching member 50 as illustrated in FIG. 11.

Next, as illustrated in FIG. 12, the belt anchor attaching member 50 is formed of a steel plate which is bent, which comprises an upper face portion 110 on which the belt anchor 106 is attached, a front face portion 112 which is bent rearward from the upper face portion 110 and extends downward, a rear face portion 114 which is bent rearward from the upper face portion 110 and extends downward, and first, second and third side face portions 116a, 116b and 116c which are respectively bent sideward from the upper face portion 110, front face portion 112 and rear face portion 114 and lapped over each other. These first, second and third side face portions 116a, 116b and 116c are welded to each other, which increases the rigidity of the belt anchor attaching member 50. At the upper face portion 110 is formed an attaching hole 118 to attach the belt anchor 106.

The belt anchor attaching member 50 has below its front face portion 112 the lower fixing portion 112a (the first fixing portion) which extends in parallel to the front wall portion 56c of the crossbar 44. At the lower fixing portion 112a is formed blot holes 119 which are located in positions corresponding to the above-described bolt holes 68 of the front crossbar member 56. Next, as illustrated in FIGS. 8 through 10, the lower fixing portion 112 of the belt anchor attaching member 50 is disposed so as to be interposed between the one end portion 46a of the upper connecting member 46 and the vertical wall portion 56c of the front crossbar member 56. Thus, as described above, the roll bar 42 and the crossbar 44 are connected via the fastening members 96 and 98, and the belt anchor attaching member 50 is connected with the roll bar 42 and crossbar 44 via the lower fixing portion 112a.

The belt anchor attaching member 50, as illustrated in FIG. 12, has above its front face portion 112 a first upper fixing portion 112b (the second fixing portion) which extends along the front side face of the roll bar 42b. It has further at its upper face portion 110 a second upper fixing portion 110a (the second fixing portion) which extends along the periphery of the roll bar 42b. These first and second upper face portions 112b and 110a are welded to the roll bar 42b.

Figure 13:
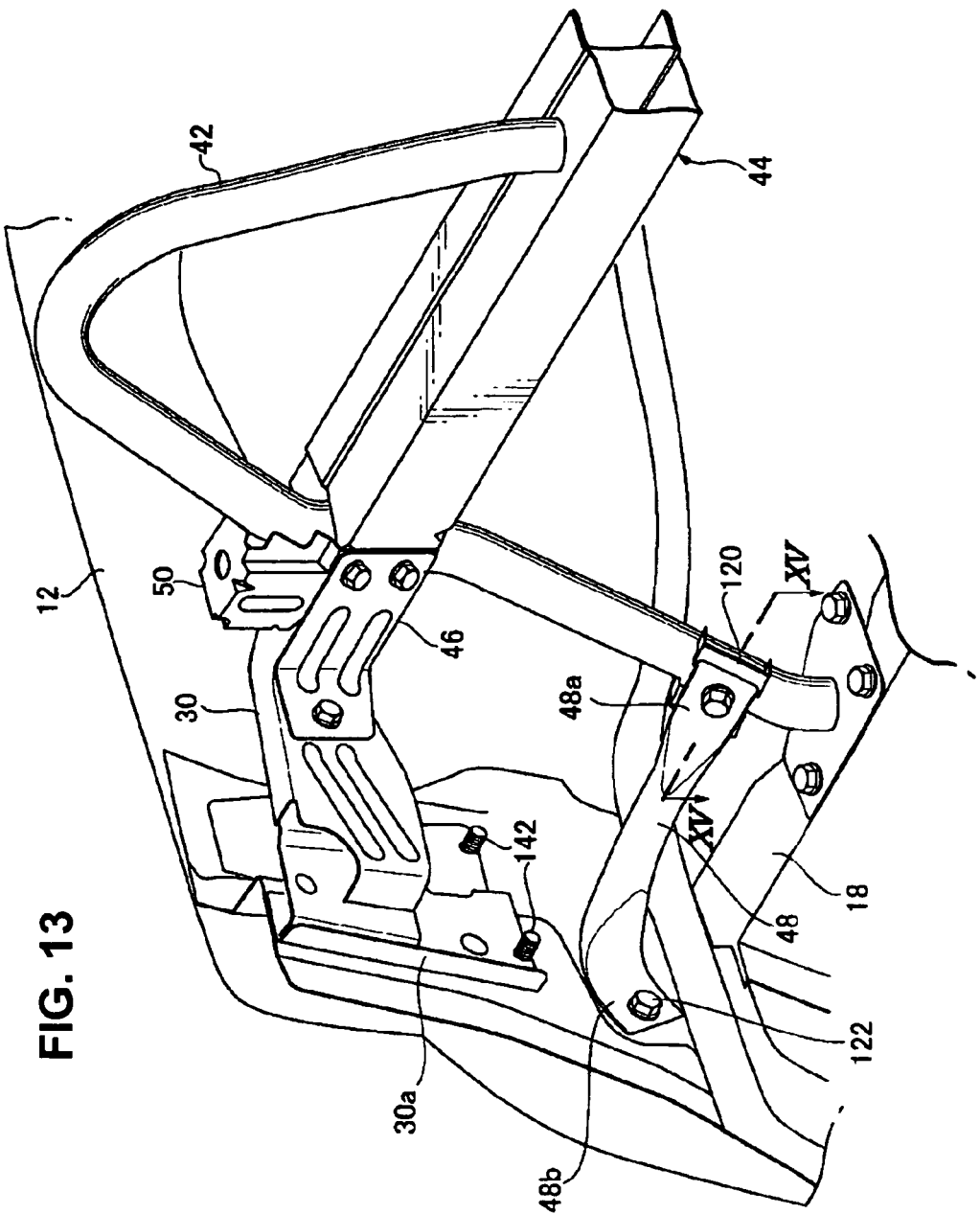
FIG. 13 is a major-part enlarged perspective view illustrating a connecting portion of the roll and the side panel of the roll bar structure according to the embodiment of the present invention.
Figure 14:
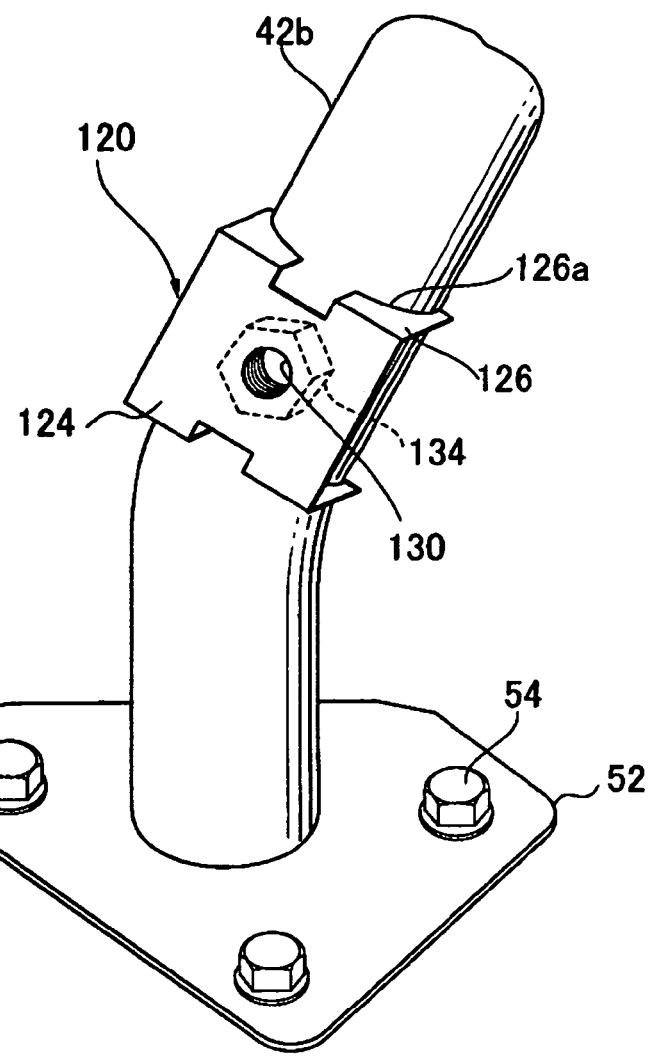
FIG. 14 is a major-part enlarged perspective view illustrating a connecting member of the roll bar and the lower connecting member of the roll bar structure according to the embodiment of the present invention.
Figure 15:
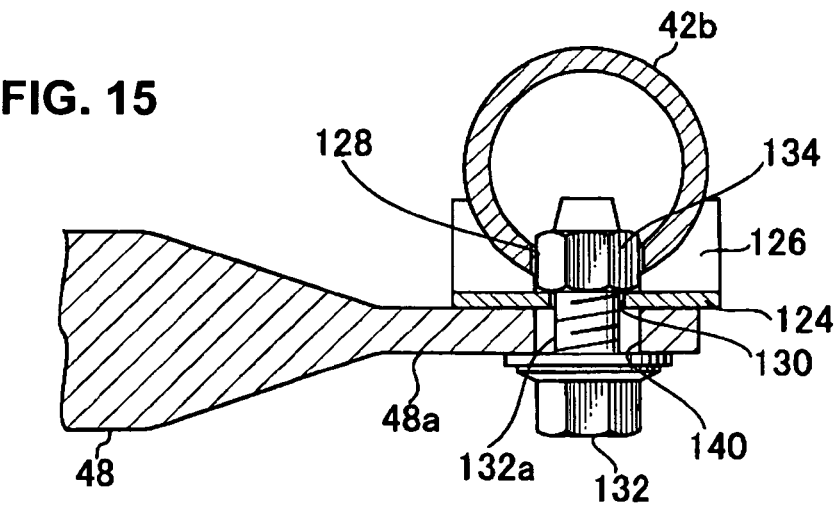
FIG. 15 is a sectional view taken along line XV-XV of FIG; 13.

Next, the connecting structure of the roll bar 42 and the side panel 12 via the lower connecting member 48 will be described referring to FIGS. 13 through 15. FIG. 13 is a major-part enlarged perspective view illustrating a connecting portion of the roll and the side panel of the roll bar structure according to the embodiment of the present invention. FIG. 14 is a major-part enlarged perspective view illustrating a connecting member of the roll bar and the lower connecting member of the roll bar structure according to the embodiment of the present invention. FIG. 15 is a sectional view taken along line XV-XV of FIG. 13.

First, as illustrated in FIG. 13, the lower connecting member 48, which extends in the vehicle width direction below the upper connecting member 46 between the roll bar 42 and the side panel 12, interconnects the roll bar 42 and the side panel 12. The lower connecting member 48 is made of a single pipe, and its both ends are formed by pressing them in a flat shape. One end portion 48a of the lower connecting member 48 is connected with the roll bar 42 via a connecting member 120 which is fixed to the roll bar 42, which will be described below, while the other end portion 48b is bent so as to extend in parallel to the side panel 12 and connected with the side panel 12 via a laterally-extending bolt 122.

Next, as illustrated in FIGS. 14 and 15, a circular hole 128 is formed at a front side of the outside part 42b of the roll bar 42, and the connecting member 120 is attached to a portion near and over the hole 128. The connecting portion 120 is formed in a U shape, which comprises an attaching portion 124 to which the one end portion 48a of the lower connecting member 48 is attached, and four flange portions 126 which extend respectively from ends of the attaching portion 124 toward the roll bar 42. These attaching portion 124 and flange portions 126 cover the front side of the roll bar 42. The four flange portions 126 extend substantially perpendicularly to an axial line of the part of roll bar which is covered by the connecting member 120, and their end portions 126a are formed so as to be along the periphery of the roll bar 42b and welded to the roll bar 42b respectively. Accordingly, the connecting member 120 is fixed to the roll bar 42.

Next, as illustrated in FIGS. 14 and 15, the attaching portion 124 of the connecting member 120 is formed in a flat shape, which extends in parallel to the axial line of the roll bar covered by the connecting member 120 in the vehicle width direction. A hole 130 is formed at the center of the attaching portion 124 so as to correspond to the above-described hole 128 of the roll bar, and a nut 134 (weld nut) is welded to the back face of the hole 130. Herein, part of the weld nut 134 is located in this hole 128.

Next, as illustrated in FIG. 15, the one end portion 48*a* formed in the flat shape of the lower connecting member 48 is lapped over the attaching portion 124 of the connecting member 120, and a hole 140 is formed At this one end portion 48*a* so as to correspond to the hole 130 and weld nut 134 at the connecting member. The hole 140 has such a specified diameter that there exists a clearance around the a shaft 132*a* of the bolt 132. The bolt 132 gets through the hole 140 of the one end portion 48*a* and the hole 130 of the connecting member 120 longitudinally, and the lower connecting member 48, connecting member 120 and roll bar 42 are connected with each other via the bolt 132 and the weld nut 134 fixed to the connecting member 120.

Herein, the front crossbar member 56 may be located rearward and the rear crossbar member 58 may be located forwardly instead in the present embodiment. Also, the inside part 42*c* of the roll bar 42 may be configured such that it extends to the cross member 18 below and its lower end is fixed to the cross member 18. Further, the lower end of the outside part 42*b* of the roll bar 42 may be configured not so as to project so much below from the crossbar 44. The lower end of the roll bar 42 may be configured so as to extend to the floor panel 2 and is connected with the floor panel 2 or any vehicle rigidity members.

Figure 16:
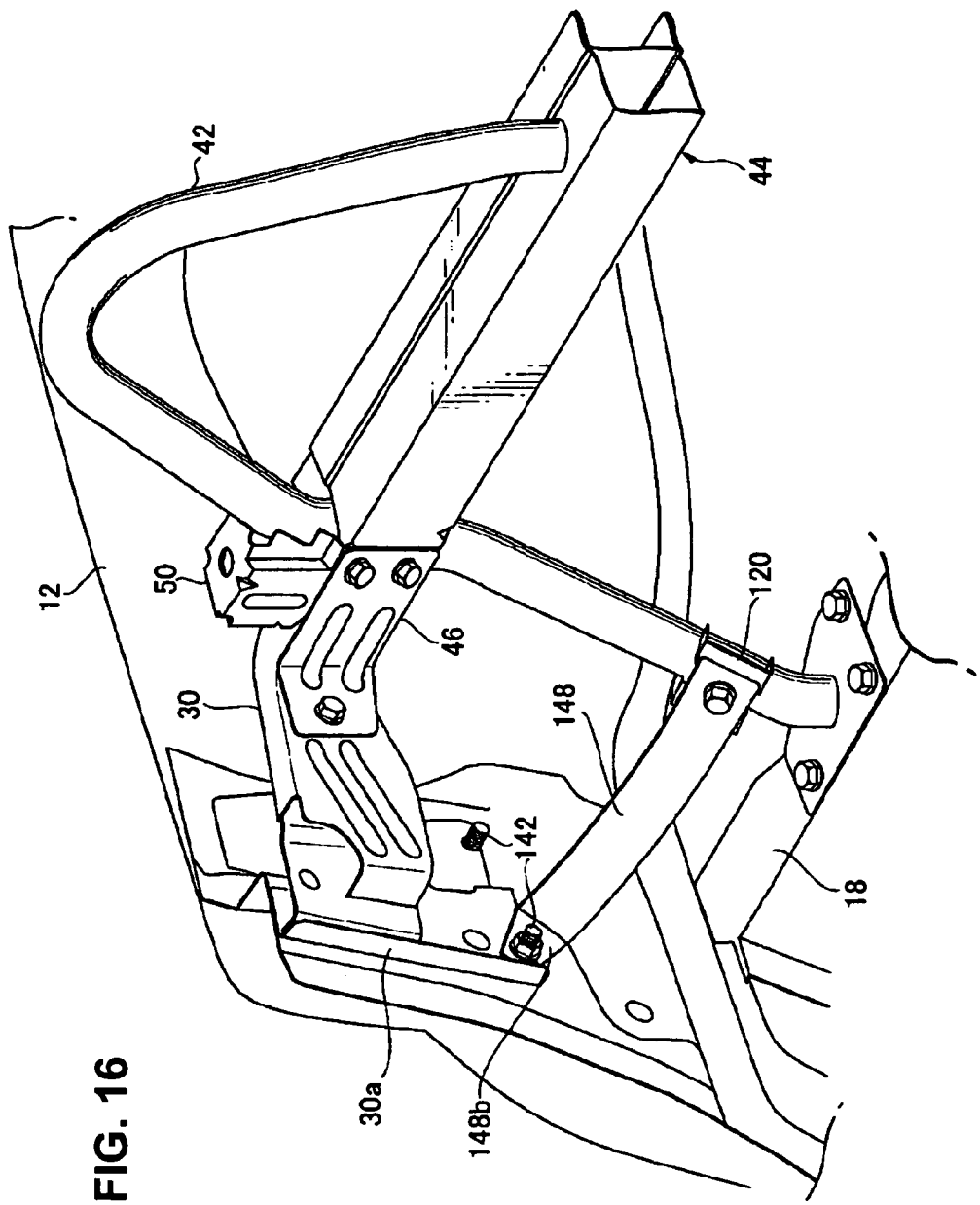
FIG. 16 is a major-part enlarged perspective view illustrating a connecting portion of a roll bar and a side panel of a roll bar structure according to a modified embodiment of the present invention.

Also, the connecting member 120 of the lower connecting member 48 and roll bar 42 may be located rearward, at a rear side of the roll bar may be provided a hole in which the weld nut 134 at the connecting member 120 is located, and then the roll bar 42 and the side panel may be connected with each other as described above. Further, as a modified example illustrated in FIG. 16, there may be provided the lower connecting member 148 which is formed in a plate shape. Herein, at the side panel 12 may be provided bolts 142 to temporarily allow the link bracket 30 to be placed thereon for its positioning during a vehicle manufacturing, and the lower end 148*b* of the lower connecting member is fixed to the side panel 12 via the bolts 142 and nuts 144.

Next, the function of the present embodiment will be described. The inside parts 42*c* of the roll bars 42 penetrate the crossbar 44 vertically in the through holes 70 formed at the upper and lower wall portions 56*a* and 56*b* of the crossbar 44, and are welded along the periphery of the through holes 70 to be connected with the upper and lower wall portions 56*a* and 56*b*. Herein, when the vehicle is rolled over, the upper part 42*a* of the roll bar may receive the longitudinal force from the road surface, thereby generating the bending moment denoted by an arrow $F_M$ in FIG. 11 against the roll bar. This bending moment may generate the force at the connecting portion of the roll bar 42 and crossbar 44 which is operative to separate the roll bar 42 from the crossbar 44. However, this force can be properly born by both of the above-described upper and lower wall portions 56*a* and 56*b* which are disposed separately in the vertical direction.

Particularly, the through holes 70 for the roll bar are formed only at either one of members constituting the cross member 44, i.e., the front cross member 56, and thus the above-described bending moment against the roll bar 42 is born by the single member. As a result, the resistance of the roll bar structure 40 against the vehicle rollover can be improved. Also, since there is not necessarily need to provide any additional members to fix the roll bar 42 to the crossbar 44, the number of parts can be reduced properly.

Further, the outside parts 42*b* of the roll bars 42 penetrate the crossbar 44 vertically through the upper and lower opening portions 86 formed by the recess portions 66 and 84 at the respective crossbar members 56 and 58. Accordingly, the above-described bending moment against the roll bar 42 can be born by both the upper wall portions 56*a* and 58*a* and the lower wall portions 56*b* and 58*b* of the crossbar 44 which are disposed separately in the vertical direction respectively. Also, since the outside parts 42*b* of the roll bars 42 are located at the recess portions 66 and 84 of the crossbar members 56 and 58 which face each other, the roll bars 42 and the crossbar 44 can be firmly connected with each other even if the roll bars 42 have their respective bent extending portions below.

Further, after the outside parts 42*b* of the roll bars 42 are disposed at the respective recess portions 66 of the crossbar member 56, the other crossbar member 58 is assembled. Accordingly, the roll bars 42 having their respective bent extending portions below can be disposed properly so as to penetrate the crossbar 44 respectively. Since the crossbar 44 is composed of the front and rear crossbar members 56 and 58 formed separately and the roll bars 42 are assembled as described above, the roll bars 42 and the crossbar 44 can be assembled easily even if the roll bars 42 have their lower extending portions bent forward.

Next, the spacer members 94 fixed to the roll bars 42 extend longitudinally within the closed section of the crossbar 44, and their both ends contact respectively the front wall portion 56*c* and the vertical wall portion 58*c* of the crossbar. Accordingly, the longitudinal positioning of the roll bars 42 and crossbar 44 can be attained surely. Also, since the above-described bending moment against the roll bars 42 is born by the spacer members 94 in addition to the upper and lower portions 56*a*, 58*a*, 56*b* and 58*b* of the crossbar, the resistance of the roll bar structure 40 against the force which the roll bars 42 receive from the road surface can be improved.

Also, since the roll bar 42, the spacer members 94 formed of the cylindrical member, and the crossbar 44 are fixed together by the fastening members 96 and 98 which penetrate the spacer members 94 and the front and rear wall portions 56*c* and 58*c* of the crossbar, the roll bars 42 and the crossbar 44 can be connected more surely. Further, even in case the fastening members 96 and 98 have been loosened or welding at the connection portions (E and F in FIG. 4) of the roll bars 42 and crossbar 44 have been weakened, both ends of the spacer members 94 contact respectively the front wall portion 56*c* and the vertical wall portion 58*c* of the crossbar, and therefore the crossbar 44 can bear the above-described force from the road surface properly. As a result, the resistance of the roll bar structure 40 against the vehicle rollover can be ensured effectively. Further, since the plural spacer members 94 are disposed separately in the vertical direction, the above-described resistance of the roll bar structure 40 can be further improved.

Next, since the rear crossbar member 58 is provided so as to face the opening portion 56*d* with the U-shaped opening of the front crossbar member 56 and the respective flange portions 72 and 82 of the respective crossbar members 56 and 58, which are lapped over each other, are provided so as to extend rearward, welding works of the lapped flange portions 72 and 82 can be done easily by a welding tool inserted from the rear, and the productivity can be improved. Also, the both ends of the upper wall portions 56a and 58a and the lower wall portions 56b and 58b of respective crossbar members can be properly welded by a spot-welding tool inserted from the outside of the crossbar 44.

Also, the respective flange portions 72 and 82 of the crossbar members 56 and 58 extend rearward and these flange portions 72 and 82 are welded each other. Accordingly, even if a shearing force $F_S$ is applied to the crossbar 44 due to the above-described bending moment $F_M$ against the roll bars 42 as illustrated in FIG. 11, the welding face will be located on the same face as the upper and lower faces of the crossbar 44 to which such a shearing force is applied. Thus, connecting of the crossbar members 56 and 58 by welding against the shearing force $F_S$ can be remained sufficiently firm. As a result, the strength of the crossbar 44 against the above-described longitudinal bending moment applied to the roll bars 42 can be increased. Further, such an increase of the strength of the crossbar 44 can also increase a connection of the outside parts 42b of the roll bars 42 at the recess portions 66 and 84 of the respective crossbar members 56 and 58, thereby improving a resistance of the roll bar structure 40 against any forces.

Next, since the roll bar support portions 80 and the flange portion 82 of the rear crossbar member 58 are disposed so as to be away from each other in the vehicle width direction, bending works of these portions 80 and 82 in opposite directions to each other with respect to the vertical wall portion 58c can be done smoothly without any interferences of bending tools. Also, since there are provided the notch portions 88, which respectively open upwardly and downwardly, between the roll bar support portions 80 and the flange portions 82 at the vertical wall portion 58c of the rear crossbar member 58, the vertical wall portion 58c between the roll bar support portions 80 and the flange portions 82 can be properly prevented from deforming improperly under the influence of bending works of these portions 80 and 82.

Herein, the notch portions 88 are formed in the R shape to avoid a stress concentration properly. Also, since these notch portions 88 opening upwardly and downwardly are located in offset positions from each other in the vehicle width direction, without aligning in the vertical direction, a decrease of strength of the structure due to the stress concentration can be restrained as much as possible.

Further, near the notch portions 88 opening upwardly and downwardly at the vertical wall portion 58c of the rear crossbar member, there are provided the beads 90 extending in the vehicle width direction sufficiently longer than the width of the notch portions 88. Accordingly, the decrease of strength of the structure due to the stress concentration by the notch portions 88 can be restrained further effectively.

Next, the crossbar 44 is connected with the upper connecting members 46 together with the roll bars 42, and the upper connecting members 46 are connected with the link brackets 30 fixed to the side panels 12. Accordingly, the force from the road surface which the roll bars 42 receive during the vehicle rollover is conveyed separately to the side panels 12 and the crossbar 44. Also, an impact load (side impact load) which the side panels 12 receive from the side during a vehicle side-impact or the like is conveyed separately to the roll bars 42 and the crossbar 44 as well. As a result, the resistance of the roll bar structure 40 against the force from the roll bars 42 and the side impact load can be further improved. Further, both the roll bars 42 and crossbar 44 bear properly a force which will let the link brackets 30 fall down inwardly, which is caused by the weight of the folding top 28 supported by the link brackets 30 or a retractable hard top. Accordingly, the link brackets 30 can be prevented properly from falling down inwardly.

Particularly, since the roll bars 42 and the upper connecting members 46 are connected via the fastening members 96 and 98 penetrating them, an integral rigidity of these members are increased, thereby improving their load-conveyance function. Likewise, since the crossbar 44 is connected with the roll bars 42 and the upper connecting members 46 via the fastening members 96 and 98 penetrating them, an integral rigidity of these members are increased, thereby improving their load-conveyance function.

Also, since the plural fastening members 96 and 98 to connect the roll bars 42, crossbar 44 and upper connecting members 46 are disposed separately in the vertical direction, the load-conveyance function of these members can be further improved surely. Particularly, the force letting the link brackets 30 fall dawn inwardly due to the weight of the folding top or retractable hard top during the opening and closing of them can be conveyed separately to the roll bars 42 and the crossbar 44 surely.

Next, the roll bars 42 and crossbar 44 are connected with the link brackets 30 fixed to the side panels 12 via the upper connecting members 46, and the roll bars 42 and the side panels are connected via the lower connecting members 48. Accordingly, the side impact load against the side panels 12 can be conveyed separately to the roll bars 42 and crossbar 44 via these two connecting members 46 and 48. Also, the lower connecting members 48 are provided below the upper connecting members 46 and above the cross member 18 as a vehicle-body reinforcement frame. Accordingly, the side impact load acting on the side panels 12 above the cross member 18 can be born by the roll bars 42 via the lower connecting members 48, and then the load convened to the roll bars 42 can be born by the crossbar 44 as well. As a result, passenger's head, shoulders and the other can be protected properly during the vehicle side impact and the like.

Further, the upper and lower connecting members 46 and 48 are provided at the side panels 12 at the vehicle both sides, and the crossbar 44 is provided to interconnect the upper connecting members 46 at the vehicle both sides. Accordingly, the side impact load applied to the upper and lower connecting members 46 and 48 is conveyed to the opposite-side roll bars 42 via the crossbar 44 respectively, and also conveyed to the opposite side panels 12 via the upper and lower connecting members 46 and 48 respectively. As a result, the input load can be conveyed to opposite sides properly, and thus the resistance of the roll bar structure 40 against the side impact load can be improved and the vehicle-body rigidity can also be improved.

Particularly, the cross member 18 as the vehicle-body reinforcement member has the rectangular structure with the closed section which has the relatively narrow width and the relatively small area in order to provide the enough disposition space for the folding-top storing portion 36 and the fuel tank 38. However, since the side impact load is conveyed separately to the roll bars 42 and crossbar 44 via the upper and lower connecting members 46 and 48, the passenger can be further protected properly.

Also, since the lower ends of the outside parts 42b of the roll bars 42 are connected with the cross member 18, the side impact load applied to the cross member 18 is conveyed to the roll bars 42, and then the force from the roll bars 42 is conveyed to the crossbar 44. As a result, the resistance of the roll bar structure 40 against the side impact load can be further improved.

Also, since there are provided the bolts 142 to temporarily place the link brackets 30 at the side panels 12, the lower connecting members 48 (148) can be fixed to the side panels 12 by using these bolts 142. As a result, since there is not necessarily need to provide any additional members to fix the lower connecting members 48 (148) to the side panels 12, the number of parts can be reduced properly.

Next, at the one end portion 48a of each of the lower connecting members 48 is provided the hole 140 having the specified diameter to provide the clearance around the bolt 132, and the bolt 132 gets through the hole 140 longitudinally, and the lower connecting member 48 and the connecting member 120 fixed to the roll bars 42 are connected with each other. Accordingly, even if there exists an error in a relative distance between the side panels 12 and the roll bars 42 in the vehicle width direction due to attaching errors during an assembly of the roll bars 42 to the cross member 18, such an error in the relative distance can be properly absorbed by an existence of the above-described clearance. Thus, the lower connecting members 48, which extend in the vehicle width direction to interconnect the side panels 12 and the roll bars 42, can be properly provided.

Particularly, even in a case where the attaching errors of the roll bars 42 to the vehicle body could not absorbed at the connecting portion of the lower connecting members 48 and the side panels 12, for example, the lower connecting members 48 need to be connected with the side panels 12 via the laterally-extending bolts 122, the lower connecting members 48 can be surely provided absorbing such attaching errors of the roll bars 42 to the vehicle body.

Also, part of the nuts 134 of the connecting members 120 are located in the holes 128 of the roll bars respectively. Accordingly, when the side impact load is applied to the lower connecting members 48, the nuts 134 hit respective edges of the holes 128 of the roll bars 42 and the side impact load can be properly conveyed to the roll bars 42 via the lower connecting members 48 thereby. Also, since the lower connecting members 48 have a structure of the closed section, their rigidity increases and the side impact load can be conveyed to the roll bars 42 surely thereby. Further, since the connecting members 120 are fixed to the roll bars 42 over the hole 128, a decrease of an axial-direction rigidity of the roll bars 42 due to forming of the hole 128 can be restrained properly by the connecting members 120.

Herein, the flange portions 126 of the connecting members 120 extend substantially perpendicularly to the axial line of the roll bars 42b, and only the end portions 126a of the flange portions 126 are fixed to the roll bars 42b. Accordingly, the connecting members 120 are fixed to the roll bars 42 having a relatively low rigidity against the side impact load conveyed from the lower connecting members 48. However, even if a relatively large side impact load is applied and then the fixing of the connecting members 120 to the roll bars 42 is released, the nuts 134 fixed to the connecting members 120 hit the edges of holes 128 of the roll bars 42 surely. As a result, the side impact load from the lower connecting members 48 can be conveyed to the roll bars 42 properly.

Next, since the belt anchor attaching members 50 are fixed to the roll bars 42 and the crossbar 44 so as to be laid across them, the belt anchor attaching members 50 and the belt anchors 106 provided thereat may not be easy to be displaced forward with respect to the roll bars 42 and crossbar 44. Further, the roll bars 42 and the crossbar 44 are connected with the side panels 12. Accordingly, even if a force to pull forward the belt anchors 106, denoted by an arrow $F_F$ in FIG. 11, is applied from the seat belts 104, such a force is born by the side panels 12, roll bars 42 and crossbar 44, and the belt anchors 106 can be prevented from being displaced forward thereby.

Also, the lower fixing portions 112a of the belt anchor attaching members 50 are fixed at the front portions 56c of the crossbar, and the upper fixing portions 112b and 110a of the belt anchor attaching members 50 are fixed to the roll bars 42b. Accordingly, even if the bending moment $F_M$ of FIG. 11 is applied to the roll bars 42 during the vehicle rollover, the bending moment of the roll bar applied to the upper fixing portions 112b and 110a can be born by the crossbar 44 to which the lower fixing portions 112a are fixed. Particularly, the lower fixing portions 112a are fixed to the front portions 56c of the crossbar. Accordingly, the belt anchor attaching members 50 support the roll bars 42 in such a manner that they push back the roll bars when the roll bars are bent forward, while they pull back the roll bars when the roll bars are bent rearward. As a result, the resistance of the roll bars 42 against the longitudinal bending moment can be improved.

Particularly, since the lower fixing portions 112a of the belt anchor attaching members 50 are fixed to the roll bars 42 in addition to the crossbar 44, the bending moment applied to the roll bars 42 is born by the belt anchor attaching members 50 in vertically-separate positions. As a result, the resistance of the roll bars 42 against the longitudinal bending moment can be further improved. Also, since the lower fixing portions 112a of the belt anchor attaching members 50 are fixed to the upper connecting members 46 in front of the roll bars 42 and between the upper connecting members 46 and the crossbar 44 as well, the resistance of the roll bars 42 against the longitudinal bending moment can be further improved.

The present invention should not limited to the above-described embodiments, but any other modifications and improvements may be applied within the scope of a sprit of the present invention.

What is claimed is:

1. A roll bar structure of a vehicle equipped with an open top and a side panel forming a vehicle side face, comprising:

a crossbar having a closed section and extending in a vehicle width direction between both of the side panels;

a roll bar having a substantially reverse-U shape and at least part thereof projecting above said crossbar; and through holes being formed at upper and lower portions of said crossbar, wherein a one-side pan of said roll bar extending substantially vertically penetrates said through holes, and said roll bar is connected respectively with said upper and lower portions of the crossbar which said roll bar penetrates, said crossbar includes a first crossbar member and a second crossbar member which are disposed in front and in rear, and said through holes are formed at either said first crossbar member or second crossbar member, and there are provided recess portions to constitute opening portions at respective upper and lower portions of said first and second crossbar members, and an other-side part of said roll bar extending substantially vertically penetrates said opening portions.

2. The roll bar structure of a vehicle of claim 1, wherein there is provided a spacer member at a portion of said roll bar which penetrates said opening portion at said crossbar and is located within said closed section of the crossbar, said spacer member extends longitudinally, and both ends thereof contact a front portion and a rear portion of said crossbar respectively.

3. The roll bar structure of a vehicle of claim 2, wherein said spacer member is formed of a cylindrical member, and there is further provided a fastening member which penetrates said front and rear portions of the crossbar and said spacer members, and fixes said spacer member to said crossbar.

4. The roll bar structure of a vehicle of claim 1, wherein either one of said first and second crossbar members includes an upper wall portion, a vertical wall portion and a lower wall portion, said upper and lower wall portions extend forward or rearward from said vertical wall portion, the other one of said first and second crossbar members includes flange portions which extend in the same direction as said upper and lower wall portions of either one of crossbar members, and said upper and lower wall portions of either one of crossbar members and said flange portions of the other one of crossbar members are connected with each other.

5. The roll bar structure of a vehicle of claim 4, wherein said the other one of crossbar members includes an upper wall portion, a vertical wall portion and a lower wall portion, said flange portions are formed respectively at said upper and lower wall portions of the other one of crossbar member, said recess portions at the other one of crossbar members are configured so as to open in an opposite direction to said flange portions extending, and there are further provided upper and lower notch portions respectively at an upper end portion and a lower end portion of said vertical wall portion of the other one of crossbar members between said flange portions and said recess portions.

6. A roll bar structure of a vehicle equipped with an open top and a side panel forming a vehicle side face, comprising:
a crossbar having a closed section and extending in a vehicle width direction between both of the side panels;
a roll bar having a substantially reverse-U shape and at least part thereof projecting above said crossbar; and
through holes being formed at upper and lower portions of said crossbar,
wherein a one-side part of said roll bar extending substantially vertically penetrates said through holes, and said roll bar is connected respectively with said upper and lower portions of the crossbar which said roll bar penetrates, and
there are further provided a link bracket being attached to the side panel to rotatably support the open top, and a connecting member connecting said roll bar with said link bracket, wherein said crossbar is connected with said connecting member along with said roll bar.

7. The roll bar structure of a vehicle of claim 6, wherein said toll bar and said connecting member are connected via a fastening member which penetrates them.

8. The roll bar structure of a vehicle of claim 6, wherein said crossbar is connected with said roll bar and said connecting member via a fastening member which penetrates them.

9. The roll bar structure of a vehicle of claim 7, wherein there are provided a plurality of said fastening members which are disposed separately in a substantially vertical direction of the vehicle.

10. A roll bar structure of a vehicle equipped with an open top and a side panel forming a vehicle side face, comprising:
a crossbar having a closed section and extending in a vehicle width direction between both of the side panels;
a roll bar having a substantially reverse-U shape and at least part thereof projecting above said crossbar; and
through holes being formed at upper and lower portions of said crossbar,
wherein a one-side part of said roll bar extending substantially vertically penetrates said through holes, and said roll bar is connected respectively with said upper and lower portions of the crossbar which said roll bar penetrates, and
there are further provided a vehicle-body reinforcement frame extending in the vehicle width direction to interconnect respective lower portions of the side panels, a first connecting member connecting said roll bar and said crossbar with the side panel, and a second connecting member connecting said roll bar with the side panel, the second connecting member being located below said first connecting member and above said vehicle-body reinforcement frame.

11. The roll bar structure of a vehicle of claim 10, wherein the vehicle further includes a storing portion to store the open top which is disposed behind said roll bar, and a fuel tank which is disposed behind said vehicle-body reinforcement frame and below said storing portion.

12. The roll bar structure of a vehicle of claim 10, wherein at the side panel is provided a bolt to allow the open top to be placed thereon temporarily during an assembly of the open top, and said second connecting member is connected with the side panel via said bolt.

13. The roll bar structure of a vehicle of claim 10, wherein said roll bar is connected with said vehicle-body reinforcement frame at a lower end thereof.

14. A roll bar structure of a vehicle equipped with an open top and a side panel forming a vehicle side face, comprising:
a crossbar having a closed section and extending in a vehicle width direction between both of the side panels;
a roll bar having a substantially reverse-U shape and at least part thereof projecting above said crossbar; and
through holes being formed at upper and lower portions of said crossbar,
wherein a one-side part of said roll bar extending substantially vertically penetrates said through holes, and said roll bar is connected respectively with said upper and lower portions of the crossbar which said roll bar penetrates, and
there are further provided a first bole formed at a front side or a rear side of said roll bar, a first connecting member attached to a portion of said roll bar which is near said first hole, a second connecting member extending in the vehicle width direction to interconnect said side panel and said first connecting member on the roll bar, an outer end of the second connecting member being fixed to the side panel, a fastened member fixed to said first connecting member on the roll bar, at least part of the fastened member being located in said first hole of the roll bar, a second hole formed at an inner end of said second connecting member extending in the vehicle width direction, said fastened member and a fastening member, which is engaged with the fastened member, penetrating the second hole, the second hole having such a specified diameter that there exists a clearance around said fastening member,
wherein said inner end of the second connecting member extending in the vehicle width direction is connected with said first connecting member on the roll bar via said fastened and fastening members.

15. The roll bar structure of a vehicle of claim 14, wherein said first connecting member on the roll bar is attached to the roll bar in a position over said first hole of the roll bar, said first connecting member on the roll bar includes a flange portion which extends respectively in a substantially perpendicular direction to an axial line of said roll bar from both ends thereof toward said roll bar, and said flange portion is fixed to said roll bar.

16. The roll bar structure of a vehicle of claim 14, wherein said second connecting member extending in the vehicle width direction has a closed section.

17. A roll bar structure of a vehicle equipped with an open top and a side panel forming a vehicle side face, comprising:
   a roll bar extending in a substantially vertical direction inside both of the side panels;
   a crossbar extending in a vehicle width direction, said roll bar being connected with the crossbar;
   a first hole formed at a front side or a rear side of said roll bar;
   a first connecting member attached to a portion of said roll bar which is near said first hole;
   a second connecting member extending in the vehicle width direction to interconnect said side panel and said first connecting member on the roll bar, an outer end of the second connecting member being fixed to the side panel;
   a fastened member fixed to said first connecting member on the roll bar, at least part of the fastened member being located in said first hole of the roll bar; and
   a second hole formed at an inner end of said second connecting member extending in the vehicle width direction, said fastened member and a fastening member, which is engaged with the fastened member, penetrating the second hole, the second hole having such a specified diameter that there exists a clearance around said fastening member,
   wherein said inner end of the second connecting member extending in the vehicle width direction is connected with said first connecting member on the roll bar via said fastened and fastening members.

* * * * *